US010998007B2

(12) United States Patent
Bedi et al.

(10) Patent No.: US 10,998,007 B2
(45) Date of Patent: May 4, 2021

(54) PROVIDING CONTEXT AWARE VIDEO SEARCHING

(71) Applicant: Adobe Inc., San Jose, CA (US)

(72) Inventors: Ajay Bedi, Hamirpur (IN); Amol Jindal, Patiala (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/588,662

(22) Filed: Sep. 30, 2019

(65) Prior Publication Data

US 2021/0098026 A1    Apr. 1, 2021

(51) Int. Cl.
| | | |
|---|---|---|
| G11B 27/34 | (2006.01) | |
| H04N 21/472 | (2011.01) | |
| H04N 21/845 | (2011.01) | |
| G06K 9/00 | (2006.01) | |

(52) U.S. Cl.
CPC .......... *G11B 27/34* (2013.01); *G06K 9/00744* (2013.01); *H04N 21/47217* (2013.01); *H04N 21/845* (2013.01)

(58) Field of Classification Search
USPC .................. 386/239–248, 343–352
See application file for complete search history.

(56) References Cited

U.S. PATENT DOCUMENTS

| | | | | |
|---|---|---|---|---|
| 2009/0161962 A1* | 6/2009 | Gallagher | ............ | G06K 9/6211 382/203 |
| 2010/0150520 A1* | 6/2010 | Hopwood | .............. | G11B 27/34 386/278 |
| 2011/0235859 A1* | 9/2011 | Imoto | ................. | G06K 9/00744 382/103 |
| 2012/0148213 A1* | 6/2012 | Bamba | ..................... | H04N 5/76 386/241 |

(Continued)

OTHER PUBLICATIONS

Ethan Rublee et al., "ORB: an efficient alternative to SIFT or SURF," Proceedings of the IEEE International Conference on Computer Vision (2011), available http://www.willowgarage.com/sites/default/files/orb_final.pdf.

(Continued)

*Primary Examiner* — Hung Q Dang
(74) *Attorney, Agent, or Firm* — Keller Jolley Preece

(57) ABSTRACT

This disclosure relates to methods, non-transitory computer readable media, and systems that can generate a context-aware-video-progress bar including a video-scene-proportionate timeline with time-interval sections sized according to relative scene proportions within time intervals of a video. In some implementations, for instance, the disclosed systems determine relative proportions of scenes within a video across time intervals of the video and generate a video-scene-proportionate timeline comprising time-interval sections sized proportionate to the relative proportions of scenes across the time intervals. By integrating the video-scene-proportionate timeline within a video-progress bar, (Continued)

the disclosed systems generate a context-aware-video-progress bar for a video. Such a context-aware-video-progress bar can facilitate more precise and intelligent scrubbing through a video, a dynamic graphical user interface for navigating within and identifying frames of the video, and a flexible user-friendly tool for quickly identifying scenes.

20 Claims, 10 Drawing Sheets

(56) References Cited

U.S. PATENT DOCUMENTS

| | | | | |
|---|---|---|---|---|
| 2012/0281922 | A1* | 11/2012 | Yamada | G06T 7/246 |
| | | | | 382/201 |
| 2014/0003799 | A1* | 1/2014 | Soroushian | H04N 19/46 |
| | | | | 386/353 |
| 2015/0169999 | A1* | 6/2015 | Duerig | G06K 9/52 |
| | | | | 382/159 |
| 2016/0070962 | A1* | 3/2016 | Shetty | G06K 9/00718 |
| | | | | 382/225 |
| 2016/0267359 | A1* | 9/2016 | Gan | G06K 9/6228 |
| 2017/0140251 | A1* | 5/2017 | Nakagawa | H04N 5/93 |
| 2017/0257596 | A1* | 9/2017 | Murata | G06K 9/00751 |
| 2019/0394350 | A1* | 12/2019 | Pangasa | G06K 9/00765 |
| 2020/0134866 | A1* | 4/2020 | Kitaura | G01C 21/20 |

OTHER PUBLICATIONS

"Video Scrubber" from Adobe Viewers Reference Guide; downloaded Oct. 24, 2019; https://marketing.adobe.com/resources/help/en_US/s7/viewers_ref/r_html5_viewer_20_customize_videoscrubber.html.

OpenCV-Python Tutorials—Feature Detection and Description; "BRIEF (Binary Robust Independent Elementary Features)"; Downloaded Oct. 24, 2019; © Copyright 2013, Alexander Mordvintsev & Abid K. Revision 43532856. https://opencv-python-tutroals.readthedocs.io/en/latest/py_tutorials/py_feature2d/py_brief/py_brief.html.

"SeekBar"; Downloaded Oct. 24, 2019; https://developer.android.com/reference/android/widget/SeekBar.

* cited by examiner

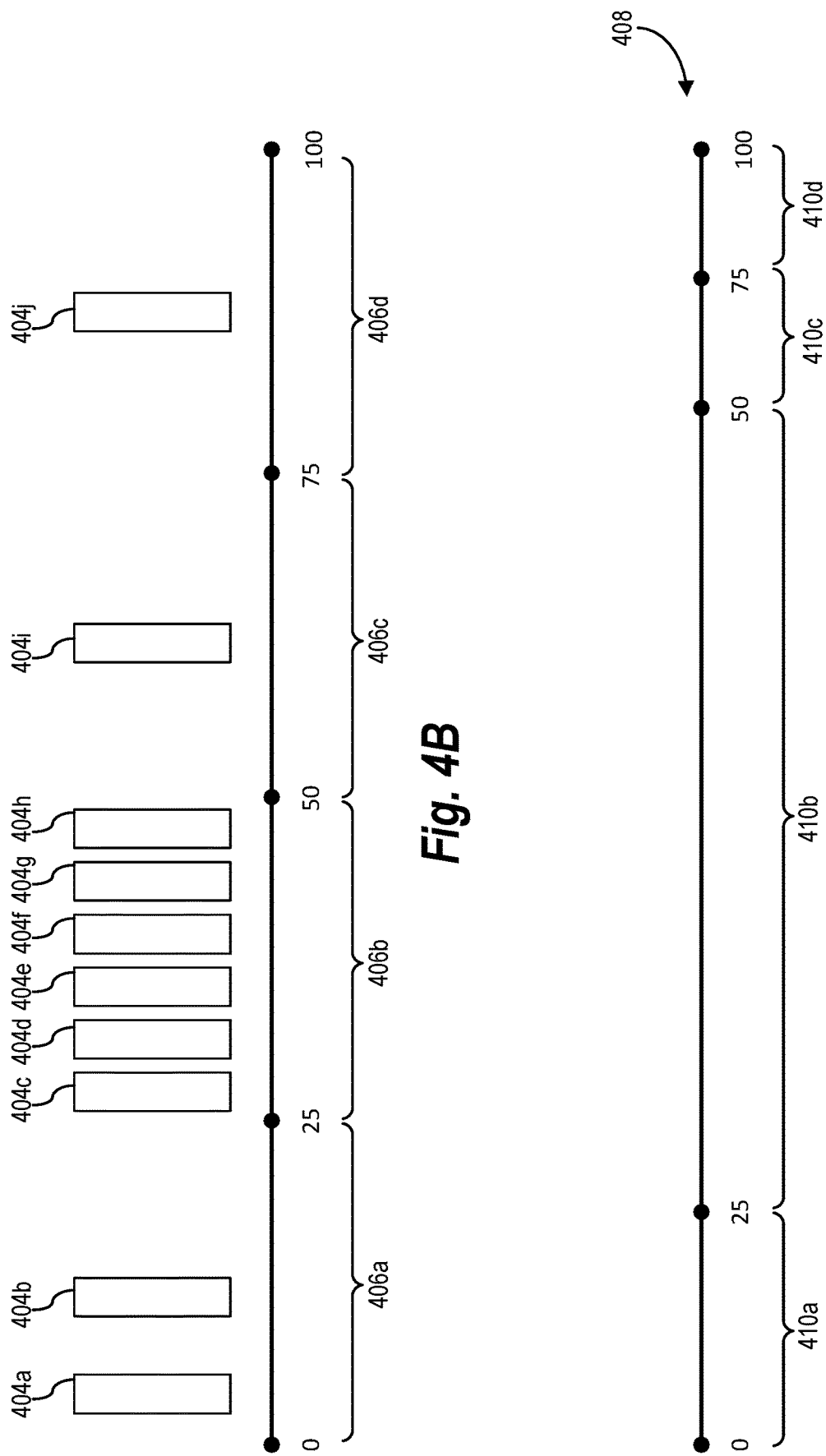

PROVIDING CONTEXT AWARE VIDEO SEARCHING

BACKGROUND

Video-player systems frequently display videos and a slider control or a video scrubber by which a user can quickly navigate to frames within such videos. By detecting a user interaction with a video scrubber, a conventional video-player system can dynamically seek any time position within a currently playing video. In some cases, existing video-player systems display a preview of a frame corresponding to a time position in a video scrubber over which a user has placed a cursor or within which a user has otherwise interacted. Despite improving visual seeking through a video, conventional video scrubber suffer from a number of drawbacks.

SUMMARY

This disclosure describes embodiments of methods, non-transitory computer readable media, and systems that can generate a context-aware-video-progress bar including a video-scene-proportionate timeline with time-interval sections sized according to relative scene proportions of a video. In some implementations, the disclosed systems determine relative proportions of scenes within a video across the video and generate a video-scene-proportionate timeline comprising time-interval sections sized proportionate to the relative proportions of scenes across the time intervals. By integrating the video-scene-proportionate timeline within a video-progress bar, the disclosed systems generate a context-aware-video-progress bar for a video. Such a context-aware-video-progress bar can facilitate more precise and intelligent scrubbing through a video, a dynamic graphical user interface for navigating within and identifying frames of the video, and a flexible user-friendly tool for quickly identifying scenes.

BRIEF DESCRIPTION OF THE DRAWINGS

The detailed description refers to the drawings briefly described below.

FIG. 4B illustrates an overview of a process in which the context-aware-video-display system determines relative proportions of reference frames across time intervals of a video in accordance with one or more embodiments.

FIG. 4C illustrates an overview of a process in which the context-aware-video-display system generates a video-scene-proportionate timeline comprising time-interval sections sized according to the relative proportions of reference frames in accordance with one or more embodiments.

DETAILED DESCRIPTION

Figure 1:
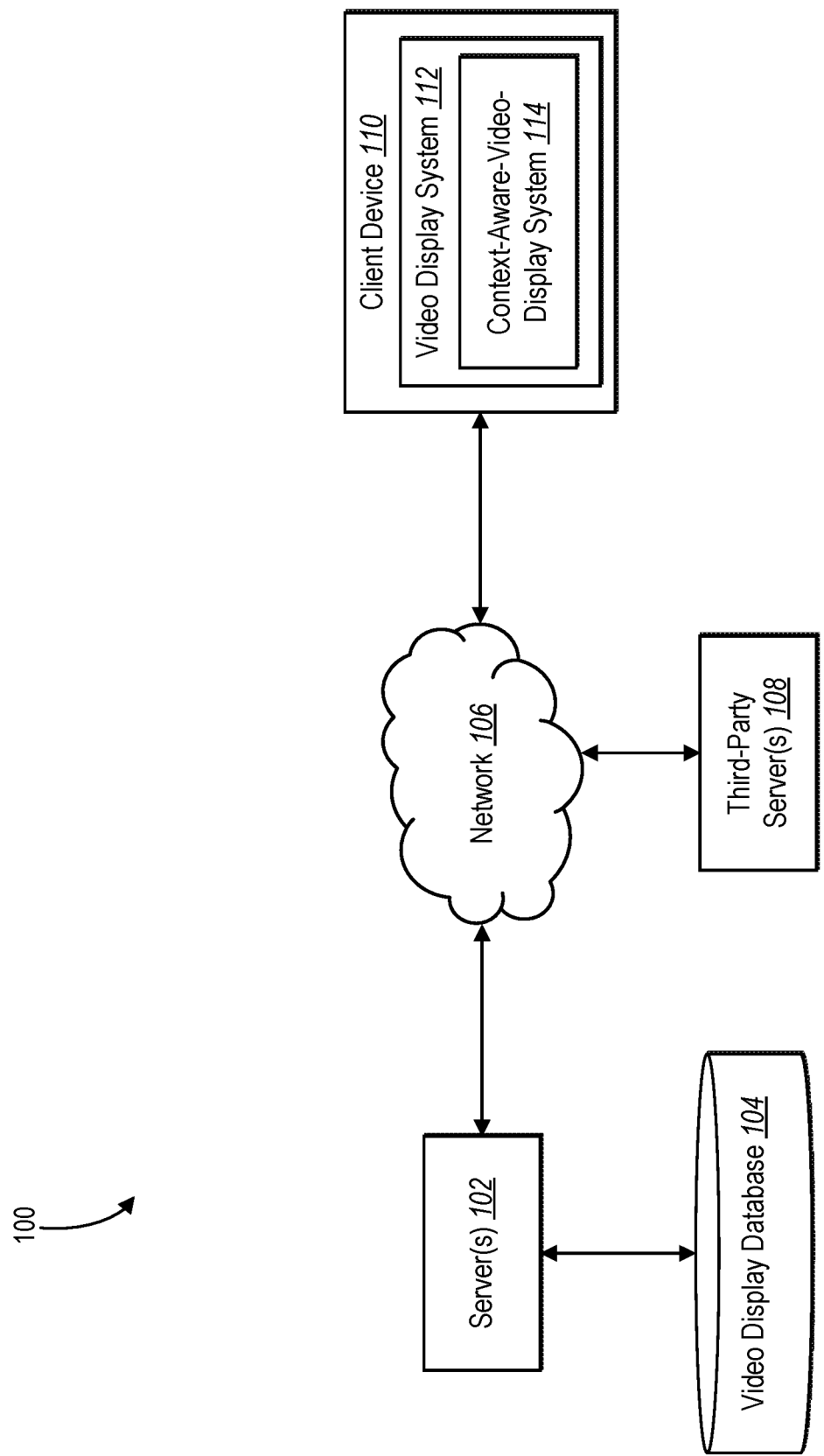
FIG. 1 illustrates a block diagram of a system including a video display system and a context-aware-video-display system in accordance with one or more embodiments.

This disclosure describes one or more embodiments of a context-aware-video-display system that generates a video-progress bar including a video-scene-proportionate timeline with time-interval sections sized according to relative scene proportions within time intervals of the video. As suggested above, conventional video-player systems suffer from a number of drawback including often having a video scrubber that exhibits imprecise scrubbing through videos for a scene or a frame, limit graphical user interfaces to a rigid and undifferentiated scale for a video, and unnecessarily slow or complicate video-player systems in visually seeking within a video. For example, conventional video-player systems typically display a video scrubber of a same length that exhibits undifferentiated scrubbing control—regardless of the length of the video (e.g., a video scrubber of the same length for a video of 60 frames or 60,000 frames). Consequently, a conventional video scrubber can represent a portion of video including rapid scene changes (or changes in motion) in a relatively small area of a video timeline. For instance, an area in a video scrubber corresponding to 11 seconds of a 4-minute video may include four different scene changes. Such a relatively small area in a video scrubber inhibits users from accurately identifying or selecting frames or scenes within that 11 seconds.

In particular, conventional video scrubbers can provide thumbnails of video scenes in response to user input with the video timeline. When there are many different scene changes in a small period of time, conventional video scrubbers typically only provide thumbnails of some of the different scenes. As such, conventional video scrubbers often do not provide thumbnails different scenes that take place within a small period of time. In view of this, conventional video scrubbers can make it difficult or impossible to locate a desired scene in the video or to discover when scene changes take place.

Conversely, a conventional video scrubber can represent a portion of video including a relatively static scene in a relatively large area of a video timeline. For instance, an area in a video scrubber corresponding to 2:01 minutes of a 4-minute video may include no scene changes. Such a relatively large area in a video scrubber for an unchanging scene can consume excess real estate within a graphical user interface and provide little additional precision when scrubbing through a video. As the preceding examples suggest, a conventional video scrubber can require a user to delicately navigate a cursor within a small area representing rapid scene changes or unnecessarily elongate navigation within a large area of little or no scene changes.

The disclosed context-aware-video-display system improves the accuracy and precision with which existing video-player systems use video scrubbers to navigate to particular scenes within a video. By generating a video-scene-proportionate timeline with different time-interval sections sized in proportion to relative proportions of scene (or corresponding reference frames), the disclosed context-aware-video-display system provides a video-progress bar with proportionally sized sections through which a user can navigate and locate frames or scenes with ease and precision.

In some implementations, for instance, the disclosed context-aware-video-display system determines relative proportions of scenes within a video across time intervals of the video and generates a video-scene-proportionate timeline comprising time-interval sections sized proportionate to the relative proportions of scenes across the time intervals. By integrating the video-scene-proportionate timeline within a video-progress bar, the context-aware-video-display system generates a context-aware-video-progress bar for a video. Such a context-aware-video-progress bar can facilitate more precise and intelligent scrubbing through a video, a dynamic graphical user interface for navigating within and identifying frames of the video, and a flexible user-friendly tool for quickly identifying scenes.

In some embodiments, for instance, the context-aware-video-display system detects reference frames corresponding to scenes within a video. The context-aware-video-display system further determines relative proportions of the reference frames across a set of time intervals within the video. Based on the relative proportions, the context-aware-video-display system generates a video-scene-proportionate timeline for the video comprising time-interval sections sized according to the relative proportions of the reference frames across the set of time intervals. In certain implementations, the context-aware-video-display system further provides, for display within a graphical user interface of a computing device, the video and a context-aware-video-progress bar comprising the video-scene-proportionate timeline.

As suggested above, in some embodiments, the context-aware-video-display system detects one or more reference frames corresponding to a scene within a video. For example, the context-aware-video-display system can identify a subset of frames corresponding to a scene within a video. In some such cases, the context-aware-video-display system identifies subsets of frames corresponding to different scenes based on the similarity of image features between (or among) contiguous frames within the video. The context-aware-video-display system can further generate a subset of feature-matching scores for the subset of frames corresponding to the scene. In some cases, the feature-matching scores indicate a degree to which a particular subset of image features within a particular frame matches subsets of image features within other frames from the same subset of frames. Based on the feature-matching scores, the context-aware-video-display system can select a reference frame from among the subset of frames corresponding to the scene (e.g., by selecting a frame from the subset of frames corresponding to a highest feature-matching score). By identifying reference frames corresponding to different scenes, the context-aware-video-display system can identify different scenes within a video.

After detecting reference frames corresponding to scenes, in some implementations, the context-aware-video-display system determines relative proportions of the reference frames across a set of time intervals within the video. For example, the context-aware-video-display system can determine a number of reference frames within each time interval from a set of equal time intervals within a video and subsequently generate a set of congestion scores for the set of time intervals. The congestion scores indicate relative proportions of the reference frames within particular time intervals. To determine a congestion score for a time interval, for instance, the context-aware-video-display system can determine a ratio of a number of reference frames within the time interval to a total number of the reference frames within the video. While a video may include or be divided into equal time intervals, in some implementations, the context-aware-video-display system determines different congestion scores indicating different relative proportions of reference frames within the equal time intervals.

Having determined relative reference-frame proportions within a set of time intervals, in some embodiments, the context-aware-video-display system generates a video-scene-proportionate timeline for a video comprising time-interval sections sized according to the relative proportions of reference frames. For instance, the context-aware-video-display system may generate (i) an initial time-interval section sized in proportion to an initial congestion score for an initial time interval of a video and (ii) a subsequent time-interval section sized in proportion to a subsequent congestion score for a subsequent time interval of the video. Because the context-aware-video-display system can adjust a size of time-interval sections in proportion to congestion scores, the initial time-interval section may be longer (or shorter) than the subsequent time-interval section within the video-scene-proportionate timeline—based on relative proportions of reference frames within each respective time interval.

As suggested above, the context-aware-video-display system can integrate a video-scene-proportionate timeline within a context-aware-video-progress bar for display with a video. For example, in certain implementations, the context-aware-video-display system provides a video and a context-aware-video-progress bar as an overlay, a tool for, or a feature of a video player rendering the video. As a video player renders a video, the context-aware-video-progress bar comprises and reflects a video-scene-proportionate timeline with different time-interval sections sized in proportion to relative proportions of reference frames within time intervals of the video. Based on detecting a user selection of a time location within a time-interval section of the context-aware-video-progress bar, for instance, the context-aware-video-display system can render (or otherwise provide for display) an image or other representation of the video from a time within the time-interval section of the video-scene-proportionate timeline.

The context-aware-video-display system can accordingly spread out portions of a video-scene-proportionate timeline corresponding to relatively rapid scene changes (or motion changes) and condense portions of the video-scene-proportionate timeline corresponding to relatively slow scene changes (or motion changes). Because the context-aware-video-progress bar can include relatively larger sections corresponding to time intervals including relatively more scenes—and relatively smaller sections corresponding to other time intervals including relatively fewer scenes—the context-aware-video-display system provides a navigation tool with which a computing device can more easily detect navigation inputs to particular frames in scene-rich areas and scrub faster through frames with little to no scene changes.

In addition to improving navigation with more precision and accuracy, the disclosed context-aware-video-display system improves and makes more efficient graphical user interfaces for videos and video scrubbers. As noted above, conventional video scrubbers cover a same length in a graphical user interface with scrubbing controls of the same targeted precision—regardless of a video's content or length. In contrast to conventional video-player systems, the context-aware-video-display system can provide a graphical user interface for a video and a corresponding context-aware-video-progress bar comprising proportional time-interval sections that facilitate user-friendly navigation. The context-aware-video-display system can appropriately size sections of a context-aware-video-progress bar within a graphical user interface to make pinpoint identification of a frame, scene, or scene change easier for a user than a conventional video scrubber. Based on detecting a user selection of a time location within a context-aware-video-progress bar corresponding to a proportionally sized time-interval section, for example, the context-aware-video-display system can render or otherwise provide for display an image (or other representation of) the video from a corresponding time within the time-interval section of the video-scene-proportionate timeline.

As indicated by the foregoing description, this disclosure describes various features and advantages of the context-aware-video-display system. As used in this disclosure, a scene includes a portion of video comprising distinctive image features. In some cases, a scene includes a subset of frames within a video comprising image features distinct to a measurable degree from other frames within the video. Accordingly, one scene may include distinctive visual features from another scene within a video. For instance, one scene may comprise an indoor background with moving objects and another scene may comprise an outdoor background with relatively static objects.

Relatedly, a reference frame includes a frame indicative (or representative) of a subset of frames corresponding to a scene. In some embodiments, a reference includes a frame comprising image features similar to (or representative of a subset of) frames corresponding to a scene based on a feature-matching score. Such a feature-matching score, for instance, indicates a degree to which a particular subset of image features within a particular frame matches subsets of image features within other frames from a subset of frames corresponding to a scene.

As suggested above, a time interval can include a distinctive measure of time within a video. In some implementations, a time interval includes one of equal (or approximately equal) measurements of time from a video. For instance, a timeline for a video may be divided into four, five, eight, or some other number of equal-sized time intervals.

As further suggested above, a video-scene-proportionate timeline includes a timeline for a video comprising sections for time intervals adjusted in size according to relative proportions of scenes (or relative proportions of reference frames) included in the respective time intervals for the video. In particular, in some embodiments, a video-scene-proportionate timeline includes a timeline for a video comprising time-interval sections adjusted in size in proportion to congestion scores for time intervals of the video. Relatedly, a congestion score comprises a score indicating a proportion or relative proportion of reference frames within a time interval of a video.

As further indicated above, a context-aware-video-progress bar includes a video control for navigating frames or scenes of a video according to a video-scene-proportionate timeline. Accordingly, in some embodiments, a context-aware-video-progress bar comprises a video scrubber, control slider, or other navigation tool for navigating through frames or scenes within time-interval sections of a video-scene-proportionate timeline based on user interactions with positions within the tool.

Turning now to FIG. 1, this figure depicts a block diagram illustrating an exemplary system 100 including a video display system 112 and a context-aware-video-display system 114 in accordance with one or more embodiments. Specifically, FIG. 1 illustrates the system 100 comprising server(s) 102, a network 106, third-party server(s) 108, and a client device 110. Although FIG. 1 illustrates one client device, in alternative embodiments, the system 100 can include any number of client devices and corresponding users. Similarly, although FIG. 1 illustrates a particular arrangement of the server(s) 102, the network 106, the third-party server(s) 108, and the client device 110, various additional arrangements are possible.

As shown in FIG. 1, the server(s) 102, the third-party server(s) 108, and the client device 110 may be communicatively coupled with each other either directly or indirectly, such as coupling through the network 106, which is described further below in relation to FIG. 8. The server(s) 102, the third-party server(s) 108, and the client device 110 may include any type of computing device, including one or more computing devices as discussed further below in relation to FIG. 8. In some embodiments, the server(s) 102 or the third-party server(s) 108 each comprise a data server, a communication server, or a web-hosting server and can generate, store, receive, and/or transmit any type of data, including user inputs requesting a rendering of a video. In certain implementations, the client device 110 comprise a computing device that allows a corresponding user to send and receive digital communications.

As further shown in FIG. 1, the client device 110 can include the video display system 112. In general, the video display system 112 facilitates playback, rendering, and modification of videos. Such videos may be stored on the server(s) 102, the third-party server(s) 108, or locally on the client device 110. In some embodiments, the video display system 112 includes editing tools for adding, modifying, or deleting frames of a video. Among other things, in certain implementations, the video display system 112 uses the client device 110 to receive user inputs identifying a video, requesting to render or pause the video, or identifying scenes or frames of the video based on user interaction with a context-aware-video-progress bar.

In some embodiments, the video display system 112 comprises one or more software applications that allow a corresponding user to send and receive digital communications. For example, the video display system 112 can be a software application installed on the client device 110 or a software application hosted on the server(s) 102. When hosted on the server(s) 102, the video display system 112 may be accessed by the client device 110 through another application, such as a web browser. In some implementations, the video display system 112 includes instructions that, when executed by a processor, cause the client device 110 to present one or more graphical user interfaces, such as user interfaces comprising frames of a video for the corresponding user to view and for the context-aware-video-display system 114 to search or scrub using a context-aware-video-progress bar.

In addition (or in the alternative) to editing and rendering videos, the video display system 112 can include the context-aware-video-display system 114. For example, in some embodiments, the context-aware-video-display system 114 uses the client device 110 to detect reference frames corresponding to scenes within a video. Upon detecting reference frames, the context-aware-video-display system 114 uses the client device 110 to further determine relative proportions of the reference frames across a set of time intervals within the video. The context-aware-video-display system 114 subsequently uses the client device 110 to generate a video-scene-proportionate timeline for the video comprising time-interval sections of the set of time intervals sized according to the relative proportions of the reference frames across the set of time intervals. As suggested above, the context-aware-video-display system 114 subsequently uses the client device 110 to provide, for display within a graphical user interface, the video and a context-aware-video-progress bar comprising the video-scene-proportionate timeline.

As suggested by previous embodiments, the context-aware-video-display system 114 can be implemented in whole or in part by the individual elements of the system 100. Although FIG. 1 illustrates the video display system 112 and the context-aware-video-display system 114 implemented within the client device 110, components of the video display system 112 and the context-aware-video-display system 114 can be implemented in other components of the system 100. For instance, in some embodiments, the server(s) 102 comprise the video display system 112 and/or the context-aware-video-display system 114 and perform all of the actions, methods, and processes of the context-aware-video-display system 114 described above and below. This disclosure describes the components of the context-aware-video-display system 114 further below with regard to FIG. 6.

As further illustrated in FIG. 1, the server(s) 102 are communicatively coupled to a video display database 104. In one or more embodiments, the server(s) 102 access and query data from the video display database 104 associated with requests from the video display system 112 or the context-aware-video-display system 114. For instance, the server(s) 102 may access videos, frames or scenes from videos, or time locations from videos for the context-aware-video-display system 114. As shown in FIG. 1, the video display database 104 is separately maintained from the server(s) 102. Alternatively, in one or more embodiments, the server(s) 102 and the video display database 104 comprise a single combined system or subsystem within the server(s) 102.

As just suggested, in some embodiments, the server(s) 102 can use the video display database 104 to implement requests from the client device 110. For example, in some embodiments, the server(s) 102 receive a render request from the client device 110 to render a video. Upon receiving the render request, the server(s) 102 can provide the video and a context-aware-video-progress bar for display within a graphical user interface of the client device 110. The client device 110 can subsequently render an image of the video from a time within a time-interval section of a video-scene-proportionate timeline—based on detecting a user selection of a time location within the time-interval section of the context-aware-video-progress bar.

Figure 2:
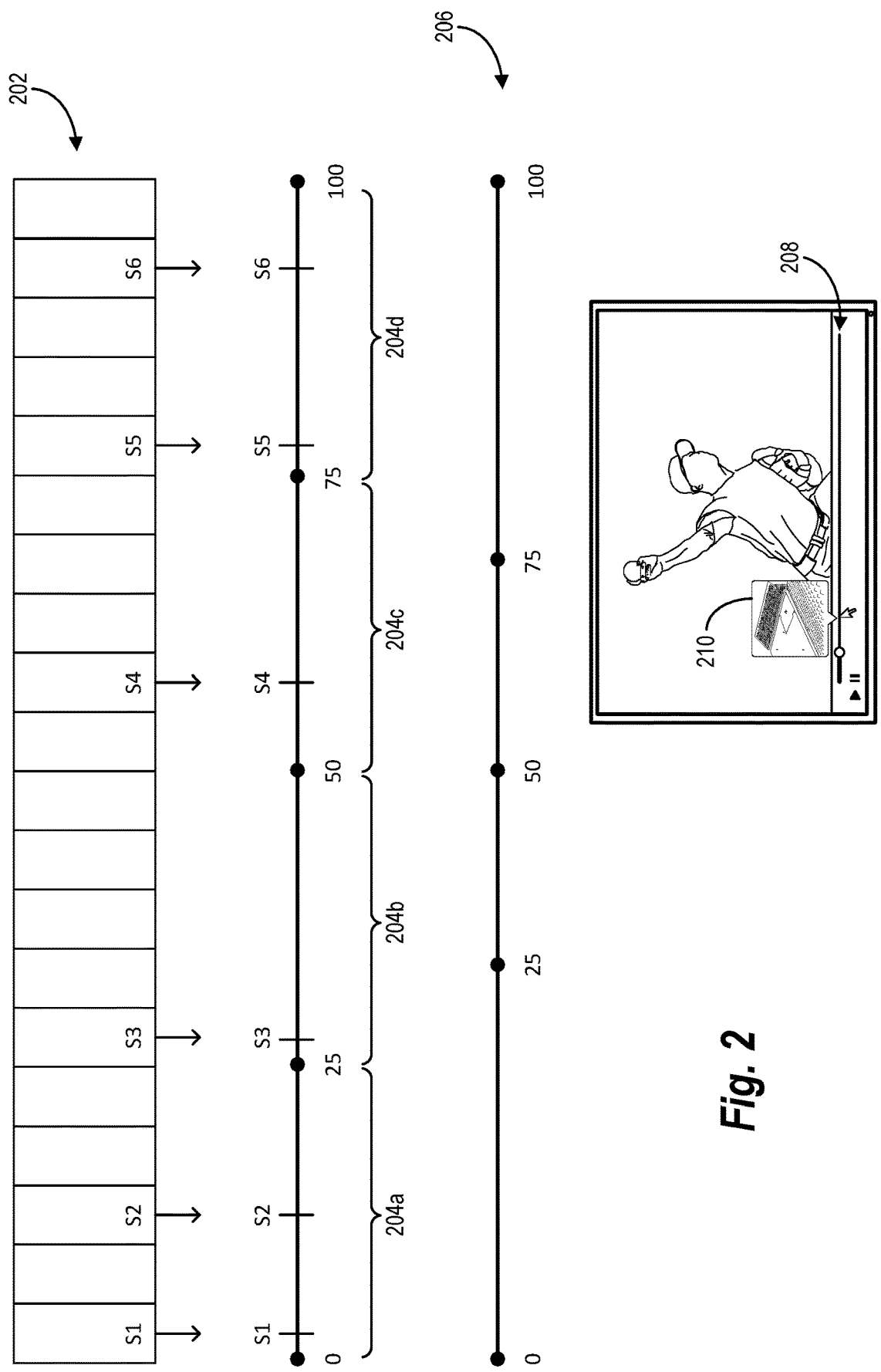
FIG. 2 illustrates an overview of the context-aware-video-display system generating a context-aware-video-progress bar including a video-scene-proportionate timeline with proportionately sized time-interval sections in accordance with one or more embodiments.

FIG. 2 illustrates an overview of the context-aware-video-display system 114 generating a context-aware-video-progress bar that includes a video-scene-proportionate timeline with proportionately sized time-interval sections in accordance with one or more embodiments. As depicted in FIG. 2, the context-aware-video-display system 114 detects scenes within a video and determines relative proportions of the scenes across time intervals within the video. The context-aware-video-display system 114 further generates a video-scene-proportionate timeline for the video comprising time-interval sections sized according to the relative proportions. Having generated a video-scene-proportionate timeline, the context-aware-video-display system 114 provides, for display within a graphical user interface, the video and a context-aware-video-progress bar comprising the video-scene-proportionate timeline.

As shown in FIG. 2, for example, the context-aware-video-display system 114 detects scenes within a video 202. For example, in some embodiments, the context-aware-video-display system 114 detects reference frames corresponding to scenes within the video 202. As by the example in FIG. 2, the context-aware-video-display system 114 detects reference frames corresponding to six scenes (S1 through S6) from among multiple frames of the video 202. To detect the reference frames, in certain implementations, the context-aware-video-display system 114 detects reference frames for scenes based on image features within the respective frames of the video 202, such as by identifying a frame representative or indicative of a subset of frames with similar image features. Alternatively, in some cases, the context-aware-video-display system 114 detects reference frames for scenes based on metadata within a video file or video packets identifying initial frames (or other reference frames) for particular scenes within the video 202.

After detecting scenes within the video 202, the context-aware-video-display system 114 determines relative proportions of scenes across time intervals 204a-204d. As shown in FIG. 2, the context-aware-video-display system 114 divides or separates the video 202 into equal or approximately equal time intervals (e.g., quarters of the video). The context-aware-video-display system 114 further determines a number of scenes within each time interval. In this particular example, the context-aware-video-display system 114 identifies two scenes (i.e., S1 and S2) within a first time interval (as indicated by time indicators 0 to 25), one scene (i.e., S3) within a second time interval (as indicated by time indicators 25 to 50), one scene (i.e., S4) within a third time interval (as indicated by time indicators 50 to 75), and two scenes (S5 and S6) within a fourth time interval (as indicated by time indicators 75 to 100).

To determine a relative proportion of scenes within a given time interval, in some embodiments, the context-aware-video-display system 114 determines a ratio of a number of scenes within the given time interval to a total number of the scenes within the video 202. The context-aware-video-display system 114 may similarly determine a percentage or distribution of scenes within each time interval as a relative proportion of scenes within a given time interval. As indicated above, the context-aware-video-display system 114 can determine relative proportions of scenes across the time intervals 204a-204d by, for instance, determining a ratio, percentage, or distribution of reference frames corresponding to scenes across the time intervals 204a-204d within the video 202.

As further shown in FIG. 2, the context-aware-video-display system 114 generates a video-scene-proportionate timeline 206 based on the relative proportions of scenes across the time intervals 204a-204d. In particular, the context-aware-video-display system 114 generates the video-scene-proportionate timeline 206 for the video 202 comprising time-interval sections sized according to the relative proportions of the scenes across the time intervals 204a-

204d. As indicated in FIG. 2, the context-aware-video-display system 114 generates the video-scene-proportionate timeline 206 comprising time-interval sections of different sizes in proportion to the relative number of scenes within each corresponding time interval.

As depicted in FIG. 2, the video-scene-proportionate timeline 206 includes a first time-interval section (corresponding to time indicators 0 to 25) proportionally sized to indicate one-third of the scenes within the video 202, a second time-interval section (corresponding to time indicators 25 to 50) proportionally sized to indicate one-quarter of the scenes within the video 202, a third time-interval section (corresponding to time indicators 50 to 75) proportionally sized to indicate one-quarter of the scenes within the video 202, and a fourth time-interval section (corresponding to time indicators 75 to 100) proportionally sized to indicate one-third of the scenes within the video 202. The video-scene-proportionate timeline 206 provides but one example of such a timeline. Other video-scene-proportionate timelines may include different numbers of time-interval sections based on different measurements of relative proportions of scenes.

Upon generating the video-scene-proportionate timeline 206, the context-aware-video-display system 114 provides the video 202 and a context-aware-video-progress bar 208 for display within a graphical user interface. As indicated by FIG. 2, the context-aware-video-progress bar 208 comprises the video-scene-proportionate timeline 206. In particular, the context-aware-video-display system 114 provides the video 202 and the context-aware-video-progress bar 208 underneath a video rendering. As suggested above, however, the context-aware-video-display system 114 can render or otherwise provide for display a context-aware-video-progress bar as an overlay, a tool for, or a feature of a video player or a software application for the video display system 112 or the context-aware-video-display system 114.

As indicated above, the context-aware-video-progress bar 208 facilitates more precise and user-friendly navigation through scenes of the video 202 than conventional video scrubbers. Based on detecting a user selection of a time location within the context-aware-video-progress bar 208, for instance, the context-aware-video-display system 114 can render (or otherwise provide for display) a thumbnail image 210 of the video 202 from a time within a corresponding time-interval section of the video-scene-proportionate timeline 206.

By proportionally sizing time-interval sections for a context-aware-video-progress bar, the context-aware-video-display system 114 generates a seeking tool that facilitates more precise and user-friendly navigation to scrub a video for a particular scene or frame. The resulting context-aware-video-progress bar can include larger time-interval sections for denser frame series of scene changes in a video and smaller time-interval section for sparser frame series of scene changes in the video.

Figure 3A:
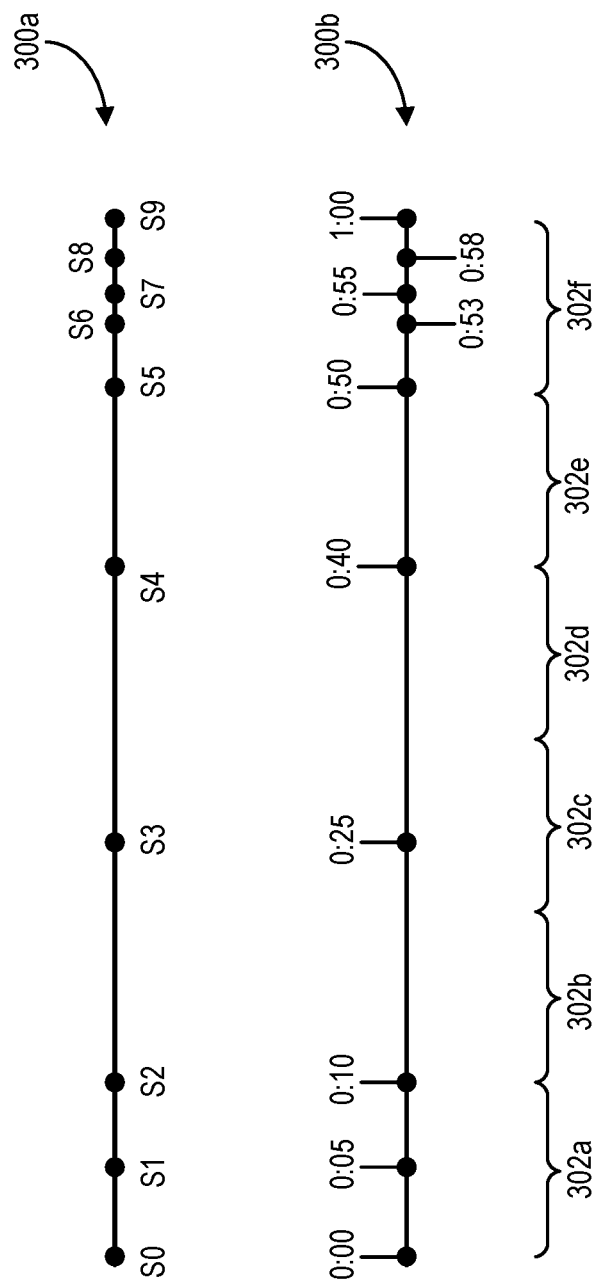
FIGS. 3A-3B illustrate an overview of a process in which the context-aware-video-display system determines relative proportions of scenes across time intervals of a video and generates a video-scene-proportionate timeline comprising time-interval sections sized according to the relative proportions of scenes in accordance with one or more embodiments.

Having provided an overview in reference to FIG. 2, additional detail regarding the generating a context-aware-video-progress bar video-scene-proportionate timeline are provided in reference to FIGS. 3A-5. In accordance with one or more embodiments, FIGS. 3A and 3B illustrate the context-aware-video-display system 114 determining relative proportions of scenes across time intervals of a video and generating a video-scene-proportionate timeline comprising a smaller time-interval section for a relatively smaller proportion of scenes and a larger time-interval section for a relatively larger proportion of scenes.

As shown in FIG. 3A, the context-aware-video-display system 114 can detect scenes within a video. For illustrative purposes, the video represented in FIG. 3A is one minute in duration. As explained below, the context-aware-video-display system 114 can identify and select one or more reference frames for each scene within a video. FIG. 3A depicts a video timeline 300a for the video comprising scenes detected by the context-aware-video-display system 114. FIG. 3A also depicts a video timeline 300b for the video comprising time locations for the video. As FIG. 3A suggests, the video timelines 300a and 300b both correspond to one another and include time intervals 302a-302f, where each time interval spans ten seconds. The video timelines 300a and 300b also represent the same video in terms of scenes and time, respectively.

As a comparison of the video timelines 300a and 300b illustrates, the video includes different proportions of scenes across the time intervals 302a-302f. In particular, the video includes a higher concentration of scenes and scene changes in a latter portion of the video (e.g., within the last ten seconds). By contrast, the video includes a smaller concentration of scenes and scene changes in a middle portion of the video (e.g., from 10 to 50 seconds). In particular, the time interval 302a includes two scenes, the time interval 302b includes part of a scene, the time interval 302c includes part of two different scenes, the time interval 302d includes part of a scene, and the time interval 302f includes four scenes.

As the video timelines 300a and 300b indicate, if a conventional video-player system were to integrate an unadjusted video timeline into a conventional video scrubber, the conventional video scrubber would facilitate cumbersome and imprecise navigation. For example, a conventional video scrubber comprising an unadjusted section corresponding to the time interval 302f would include a relatively higher concentration of scenes—with little room for error in selecting a time location along the video scrubber for a particular scene. By contrast, the conventional video scrubber comprising unadjusted sections corresponding to the time intervals 302b-302e would include a relatively lower concentration of scenes—with relatively slower navigation to move through scenes. To avoid such cumbersome navigation, the context-aware-video-display system 114 generates a video-scene-proportionate timeline.

Figure 3B:
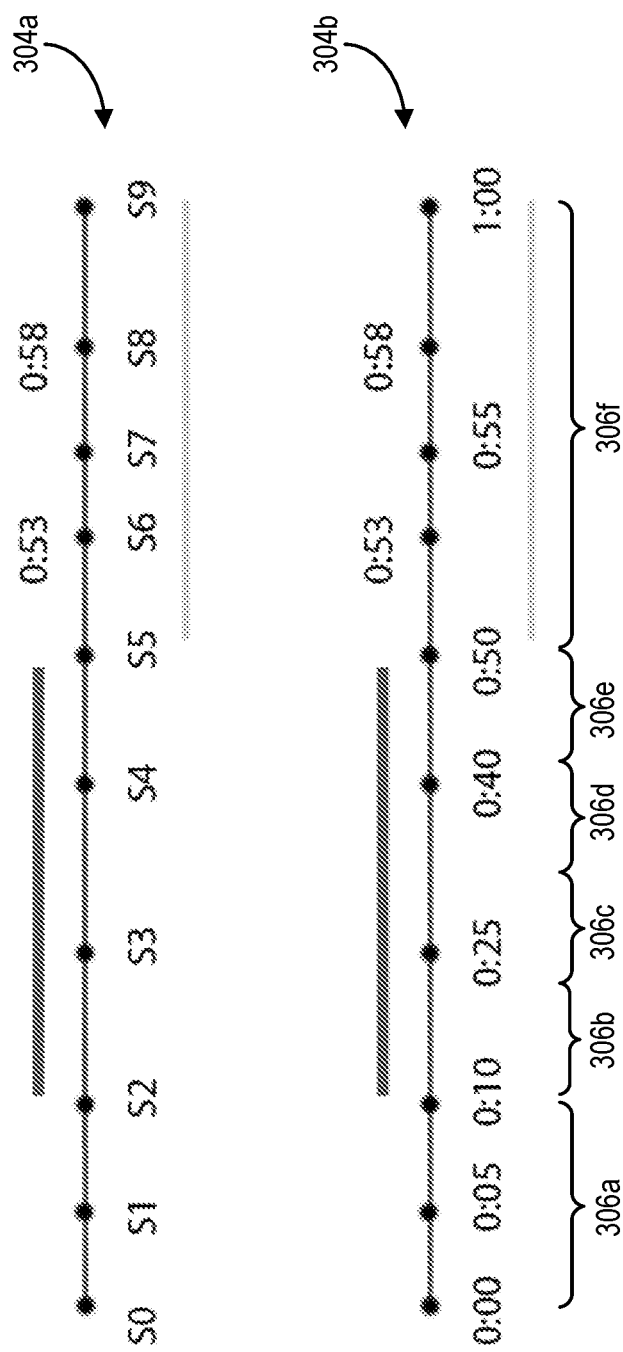

As shown in FIG. 3B, the context-aware-video-display system 114 generates a video-scene-proportionate timeline comprising time-interval sections 306a-306f sized proportionate to the relative proportions of scenes across corresponding time intervals. FIG. 3B depicts the same video-scene-proportionate timeline both in terms of scenes and time. As shown in FIG. 3B, a video-scene-proportionate timeline 304a comprises the same scenes from the video detected by the context-aware-video-display system 114 as shown in FIG. 3A. By contrast, a video-scene-proportionate timeline 304b comprises time locations for the video. As FIG. 3B suggests, the video-scene-proportionate timelines 304a and 304b both correspond to one another and include the time-interval sections 306a-306f.

As demonstrated by the video-scene-proportionate timelines 304a and 304b, the context-aware-video-display system 114 sizes the time-interval sections 306a-306f in proportion to a relative concentration of scenes within each time-interval section. As shown in FIG. 3B, for example, the context-aware-video-display system 114 generates the time-interval sections 306b-306e with relatively smaller areas to reflect the relatively sparser concentration of scenes within time intervals corresponding to the time-interval sections

306b-306e. By contrast, the context-aware-video-display system 114 generates the time-interval section 306f with a relatively larger area to reflect the relatively denser concentration of scenes within the time interval corresponding to the time-interval section 306f. The context-aware-video-display system 114 thus appropriately sizes time-interval sections to facilitate pinpoint identification of a frame, scene, or scene change easier for a user than a conventional video scrubber.

Figure 4A:
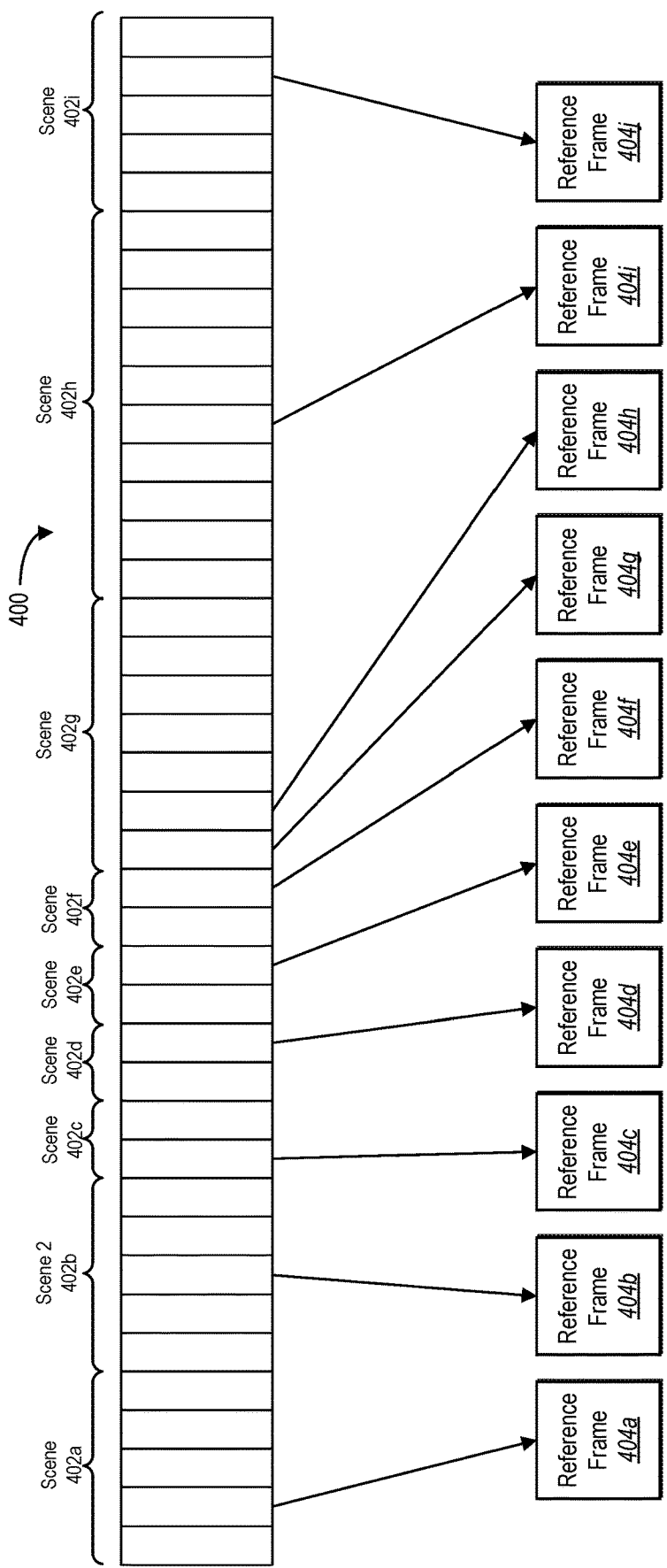
FIG. 4A illustrates an overview of a process in which a context-aware-video-display system detects reference frames from among frames of a video in accordance with one or more embodiments.

As indicated above, the context-aware-video-display system 114 generates a video-scene-proportionate timeline based on relative proportions of reference frames corresponding to scenes across time intervals. FIGS. 4A-4C depict the context-aware-video-display system 114 detecting reference frames corresponding to scenes within a video and determining relative proportions of the reference frames across time intervals from the video. The context-aware-video-display system 114 further generates a video-scene-proportionate timeline for the video comprising time-interval sections sized according to the relative reference-frame proportions.

As shown in FIG. 4A, for example, the context-aware-video-display system 114 identifies subsets of frames corresponding to scenes 402a-402i within a video 400. The context-aware-video-display system 114 further generates subsets of feature-matching scores for each subset of frames corresponding to the scenes 402a-402i. Based on the feature-matching scores, the context-aware-video-display system 114 selects a reference frame from among each subset of frames corresponding to a scene. By selecting such reference frames, the context-aware-video-display system 114 identifies reference frames 404a-404j corresponding to the scenes 402a-402i, where each scene corresponds to a reference frames—except that the scene 402g corresponds to multiple reference frames, the reference frames 404g and 404h. For illustrative purposes, FIG. 4A includes an example of number of frames and subset of frames corresponding to each of the scenes 402a-402i that fit within space restrictions. In a real-world example, each of the scenes 402a-402i for the video 400 may include more frames within each respective subset of frames.

As indicated above, the context-aware-video-display system 114 can identify subsets of frames corresponding to the scenes 402a-402i within the video 400 based on (i) metadata within a video file or within video-data packets or (ii) similarity of image features between (or among) contiguous frames from the video. For example, in certain implementations, the context-aware-video-display system 114 identifies scene tags from the metadata of a video file or within video-data packets identifying one (or both) of an initial frame and an ending frame for each of the scenes 402a-402i. Additionally, or alternatively, the context-aware-video-display system 114 identifies a subset of frames corresponding to each of the scenes 402a-402i based on comparing image features within each frame to image features within a set of contiguous frames and identifying one (or both) of an initial frame and an ending frame for a scene comprising image features distinguishable from the contiguous frames with reference to a matching threshold.

In some embodiments, the context-aware-video-display system 114 identifies a subset of frames corresponding to each of the scenes 402a-402i based on image features—as follows. The context-aware-video-display system 114 detects image features within a set of frames corresponding to the video 400. The context-aware-video-display system 114 further selects a frame and compares (i) a subset of image features from the selected frame to (ii) a subset of image features from each frame of a contiguous set of frames in proximity to the selected frame. Such a contiguous set of frames may be within a threshold number of frames from the selected frame (e.g., within 16 or 20 frames from the selected frame). The context-aware-video-display system 114 further determines whether the subset of image features from the selected frame satisfies a matching threshold when compared to the subset of image features from each frame of the contiguous set of frames. Such a matching threshold may be a minimum percentage of matching image features (e.g., less than or equal to 50% or 60% matching image features). When the selected frame does not satisfy the matching threshold in comparison to the contiguous set of frames, the context-aware-video-display system 114 identifies the selected frame as an initial frame for a subset of frames corresponding to the scene. By identifying initial frames corresponding to different scenes, the context-aware-video-display system 114 can identify an initial frame and an ending frame for a subset of frames corresponding to each of the scenes 402a-402i.

To identify image features within the frames of the video 400, in some embodiments, the context-aware-video-display system 114 resizes each frame to a smaller size (e.g., 256 pixels in length or 512 pixels in length). The context-aware-video-display system 114 further applies a feature-detection algorithm to detect a subset of feature points within each resized frame. For example, the context-aware-video-display system 114 can apply a Features from Accelerated Segment Test (FAST) detection algorithm, a Binary Robust Independent Elementary Features (BRIEF) detection algorithm, or an Oriented FAST and rotated BRIEF (ORB) detection algorithm (as described by Ethan Rublee et al., "ORB: an efficient alternative to SIFT or SURF," Proceedings of the IEEE International Conference on Computer Vision (2011), the entire contents of which are hereby incorporated by reference) to detect a subset of feature points within each resized frame. In certain implementations, the context-aware-video-display system 114 applies the FAST detection algorithm to identify key points within a frame and a Harris-Corner-Detection algorithm to find the top N feature points from among the key points of each resized frame. The context-aware-video-display system 114 further uses a pyramid algorithm to identify multiscale-features from each resized frame (e.g., Gaussian pyramid, Laplacian pyramid, or Steerable pyramid).

Alternatively, the context-aware-video-display system 114 may use any suitable feature-detection algorithm to detect feature points within frames, including, but not limited to, a Laplacian of Gaussian algorithm, a Principal Curvature-Based Region (PCBR) algorithm, a Scale-Invariant Feature Transform (SIFT) algorithm, a Speed up Robust Feature (SURF) algorithm, or a Smallest Univalue Segment Assimilating Nucleus (SUSAN) algorithm.

To identify an initial frame (and a corresponding ending frame) for each subset of frames corresponding to a scene ($S_i$), in some embodiments, the context-aware-video-display system 114 identifies and tallies a number of feature points (i) detected from the feature-detection algorithm and (ii) shared in common between a selected frame and another frame within a threshold distance of the selected frame. For example, the context-aware-video-display system 114 can identify and tally a number of feature points between a selected frame ($F_s$) and a previous frame ($F_p$). When the number of matching feature points between the selected frame ($F_s$) and the previous frame ($F_p$) are equal to (or less than) a matching threshold of feature points, the contextaware-video-display system 114 temporarily identifies the selected frame ($F_s$) as an initial frame for a start of a scene ($S_i$).

Continuing the example from the previous paragraph, the context-aware-video-display system 114 further identifies and tallies a number of feature points between the selected frame ($F_s$) and a contiguous frame ($F_c$) from frames within a threshold number of frames (K) from the selected frame ($F_s$), such as a threshold of 16, 20, or 30 frames. When the number of matching feature points between the selected frame ($F_s$) and each contiguous frame ($F_p$) from a set of contiguous frames are equal to (or less than) a matching threshold of feature points, the context-aware-video-display system 114 identifies (or confirms that) the selected frame ($F_s$) as an initial frame for a start of a scene ($S_i$). By identifying an initial frame corresponding to each scene ($S_i$), the context-aware-video-display system 114 can identify an initial frame ($F_t$) and an ending frame ($F_e$) for a subset of frames corresponding to each scene ($S_i$), where $S_i$=$F_i$→$F_e$.

After identifying a subset of frames for each of the scenes 402a-402i from the video 400, the context-aware-video-display system 114 selects one or more reference frames for each scene. As shown in FIG. 4A, for instance, the context-aware-video-display system 114 selects the reference frames 404a-404j for the scenes 402a-402i, where the scene 402g corresponds to the reference frames 404g and 404h. As indicated above, the context-aware-video-display system 114 can identify one or more reference frames for each of the scenes 402a-402i from the video 400 based on (i) metadata within a video file or within video-data packets or (ii) feature-matching scores from frames within each subset of frames. For example, in certain implementations, the context-aware-video-display system 114 identifies reference-frame tags within the metadata of a video file or within video-data packets identifying one or more reference frames for each of the scenes 402a-402i. Alternatively, the context-aware-video-display system 114 generates a feature-matching score each frame from a subset of frames by determining a mean number of matching image features for the frame in common with each other frame within the subset of frames corresponding to a scene.

In some implementations, for instance, the context-aware-video-display system 114 scans through each subset of frames for a scene ($S_i$). The context-aware-video-display system 114 further determines a number of feature points that a given frame ($F_g$) has in common with each other frame ($F_O$) within the subset of frames for a scene ($S_i$). The context-aware-video-display system 114 subsequently determines a mean number of feature points—or a mean-feature-matching score (FMS)—that the given frame ($F_g$) matches (or has in common) with each other frame ($F_O$) within the subset of frames, where FMS($F_g$)=1/N and represents a sum of image features within the given frame ($F_g$) matching other frames ($F_O$) within a subset of frames for a scene ($S_i$). The context-aware-video-display system 114 can store such a mean-feature-matching score (FMS) for the given frame ($F_g$) within a memory of a database, client device, server, or other computing device. The context-aware-video-display system 114 subsequently selects a frame from the subset of frames for each scene ($S_i$) as a reference frame. For example, the context-aware-video-display system 114 may select, as a reference frame, a frame corresponding to a highest mean-feature-matching score from among a subset of frames for a scene for each scene ($S_i$).

As indicated above, in some cases, the context-aware-video-display system 114 selects multiple reference frames for a scene. In FIG. 4A, for instance, the context-aware-video-display system 114 selects the reference frames 404g and 404h for the scene 402g. The context-aware-video-display system 114 may select multiple reference frames for such a scene based on (i) identifying multiple reference-frame tags for a scene within metadata or (ii) identifying multiple subsets of frames corresponding to a single scene based on image features. In some embodiments, for instance, the context-aware-video-display system 114 identifies multiple frames corresponding to a single scene, where the multiple frames each comprise image features that are equal to (or less than) a matching threshold of image features. In some such instances, the context-aware-video-display system 114 identifies different subsets of frames corresponding to a single scene and accordingly selects a reference frame corresponding to each subset of frames for the single scene.

After detecting reference frames corresponding to scenes within a video, in some implementations, the context-aware-video-display system 114 further determines relative proportions of the reference frames across a set of time intervals for a video. In accordance with one or more embodiments, FIG. 4B depicts the context-aware-video-display system 114 determining a number of the reference frames 404a-404j in each time interval from time intervals 406a-406d for the video 400. In FIG. 4B, each of the time intervals 406a-406d is equal (or approximately equal) to a same duration. Based on the determined numbers of the reference frames 404a-404j in each time interval, the context-aware-video-display system 114 further determines relative proportions of the reference frames 404a-404j across the time intervals 406a-406d. In some such cases, the context-aware-video-display system 114 can generate a normalized congestion score indicating a relative proportion of the reference frames 404a-404j in each of the time intervals 406a-406d.

As shown in FIG. 4B, for example, the context-aware-video-display system 114 determines a number of the reference frames 404a-404j in each of the time intervals 406a-406d. In some embodiments, the context-aware-video-display system 114 plots the reference frames 404a-404j across a timeline of the video 400 comprising the time intervals 404a-406d to determine a number of the reference frames 404a-404j in each time interval. Additionally, or alternatively, the context-aware-video-display system 114 identifies a time for each of the reference frames 404a-404j and determines a corresponding time interval from the time intervals 404a-406d to determine a number of the reference frames 404a-404j in each time interval. Regardless of the determination method, as indicated by FIG. 4B, the context-aware-video-display system 114 determines that the time interval 406a includes the reference frames 404a and 404b; the time interval 406b includes the references frames 404c, 404d, 404e, 404f, and 404h; the time interval 406c includes the reference frame 404i; and the time interval 406d includes the reference frame 404j.

As indicated above, in some implementations, the context-aware-video-display system 114 determines a number of the reference frames 404a-404j in each time interval by generating an initial congestion score (CGS). Such an initial congestion score (CGS) constitutes the number of reference frames within a time interval. As indicated by FIG. 4B, for instance, the context-aware-video-display system 114 generates an initial congestion score of two reference frames for the time interval 406a, an initial congestion score of six reference frames for the time interval 406b, an initial congestion score of one reference frame for the time interval 406c, and an initial congestion score of one reference frame for the time interval 406d.

After determining the number of the reference frames 404a-404j in each time interval, the context-aware-video-display system 114 further determines relative proportions of the reference frames 404a-404j across the time intervals 406a-406d. As indicated above, the context-aware-video-display system 114 may determine a ratio, percentage, or distribution of the reference frames 404a-404j across the time intervals 406a-406d to determine a relative proportion of the reference frames 404a-404j within each of the time intervals 406a-406d. For instance, the context-aware-video-display system 114 may determine (and represent) such a relative proportion of reference frames for a time interval as a congestion score.

As indicated above, in some embodiments, the context-aware-video-display system 114 normalizes the initial congestion score (CGS) for each time interval to generate a normalized congestion score (CNS) for each time interval. Such a normalized congestion score (CNS) indicates a ratio of a number of reference frames within a time interval to a total number of reference frames within a video. For the time intervals 406a-406d from FIG. 4B, for example, the context-aware-video-display system 114 generates a normalized congestion score of $2/10$ (or 0.2) for the time interval 406a, a normalized congestion score of $6/10$ (or 0.6) for the time interval 406b, a normalized congestion score of $1/10$ (or 0.1) for the time interval 406c, and a normalized congestion score of $1/10$ (or 0.1) for the time interval 406d.

As further indicated above, after determining relative proportions of reference frames, the context-aware-video-display system 114 can generate a video-scene-proportionate timeline for a video comprising time-interval sections sized according to the relative reference-frame proportions. In accordance with one or more embodiments, FIG. 4C depicts the context-aware-video-display system 114 generating a video-scene-proportionate timeline 408 for the video 400 based on the relative proportions of the reference frames 404a-404j across the time intervals 406a-406d. In particular, the context-aware-video-display system 114 generates the video-scene-proportionate timeline 408 comprising time-interval sections 410a-410d sized according to the relative proportions of the reference frames 404a-404j across the time intervals 406a-406d.

To generate the video-scene-proportionate timeline 408, in some cases, the context-aware-video-display system 114 generates the time-interval sections 410a-410d in proportion to a normalized congestion score (CNS) for each corresponding time interval. Because a size of a time-interval section proportionally depends on a normalized congestion score (CNS), the context-aware-video-display system 114 generates (i) a relatively larger time-interval section for a relatively larger normalized congestion score (CNS) and (ii) a relatively smaller time-interval section for a relatively smaller normalized congestion score (CNS). Accordingly, in certain cases, the size of each of the time-interval section 410a-410d along the video-scene-proportionate timeline 408 is in proportion to a corresponding normalized congestion score (CNS).

In particular, as depicted in FIG. 4C, the context-aware-video-display system 114 generates the video-scene-proportionate timeline 408 comprising (i) the time-interval section 410a proportionally sized to indicate one-fifth of the reference frames 404a-404j based on a normalized congestion score for the time interval 406a; (ii) the time-interval section 410b proportionally sized to indicate three-fifths of the reference frames 404a-404j based on a normalized congestion score for the time interval 406b; (iii) the time-interval section 410c proportionally sized to indicate one-tenth of the reference frames 404a-404j based on a normalized congestion score for the time interval 406c; and (iii) the time-interval section 410d proportionally sized to indicate one-tenth of the reference frames 404a-404j based on a normalized congestion score for the time interval 406d.

By generating the video-scene-proportionate timeline 408 with different time-interval sections sized in proportion to relative proportions of reference frames, the context-aware-video-display system 114 can accordingly generate a context-aware-video-progress bar with proportionally sized sections through which a user can navigate and locate frames or scenes with ease and precision. In accordance with one or more embodiments, FIG. 5 illustrates the context-aware-video-display system 114 providing a context-aware-video-progress bar 514 comprising a video-scene-proportionate timeline.

Figure 5:
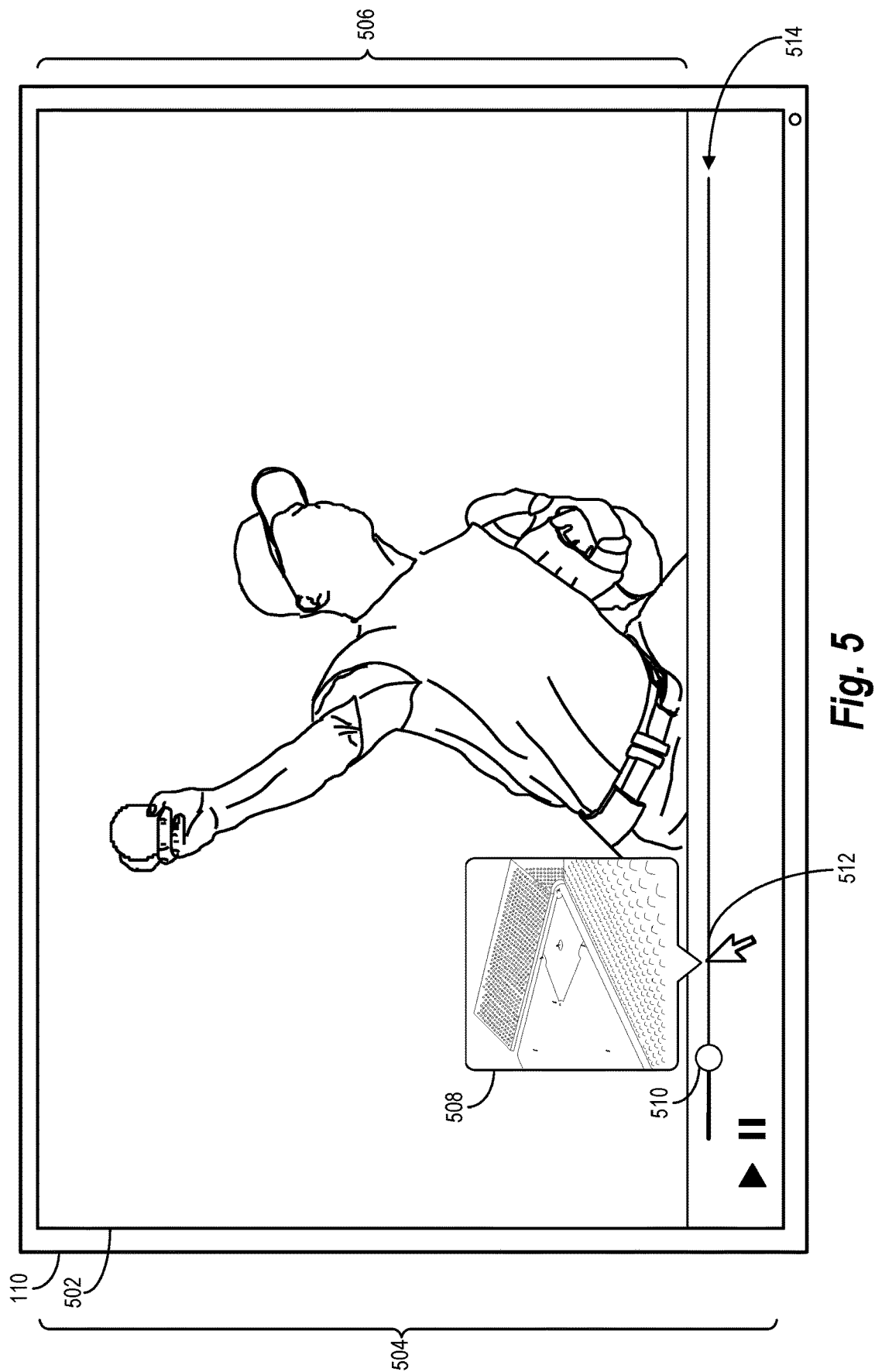
FIG. 5 illustrates a context-aware-video-progress bar comprising a video-scene-proportionate timeline in accordance with one or more embodiments.

As shown in FIG. 5, the client device 110 presents a video 506 and the context-aware-video-progress bar 514 within a graphical user interface 504 for a screen 502. FIG. 5 depicts the graphical user interface 504 from the perspective of the client device 110 implementing computer-executable instructions of a software application for the video display system 112 or the context-aware-video-display system 114 to perform certain actions. In FIG. 5, the client device 110 may detect various suitable user interactions, including, but not limited to, an audio input into a microphone, a keyboard input, a mouse click, a stylus interaction with a touch screen, or a touch gesture with a touch screen.

As further shown in FIG. 5, the client device 110 presents a frame of the video 506 from a time corresponding to a progress marker 510 within the context-aware-video-progress bar 514. Accordingly, the progress marker 510 indicates a time corresponding to the frame of the video 506 shown within the graphical user interface 504. As the client device 110 continues to present (or play) frames from the video 506, the client device 110 adjusts the location of the progress marker 510 to correspond to the time for a currently presented frame.

As further indicated above, the context-aware-video-display system 114 integrates a video-scene-proportionate timeline within the context-aware-video-progress bar 514. Accordingly, in certain implementations, the context-aware-video-progress bar 514 includes time-interval sections of a video-scene-proportionate timeline sized proportionate to relative proportions of reference frames (or scenes) across time intervals of the video 506. In some cases, for instance, the context-aware-video-progress bar 514 includes (i) a relatively larger time-interval section corresponding to a time interval including relatively more reference frames and (ii) a relatively smaller time-interval section corresponding to another time interval including relatively fewer reference frames. The context-aware-video-progress bar 514 may accordingly include time-interval sections of unequal areas that do not proportionately reflect the time duration of their corresponding time intervals.

FIG. 5 depicts the context-aware-video-progress bar 514 as a feature or tool of an application executing on the client device 110. As noted above, a client device may likewise present a context-aware-video-progress bar as an overlay, a tool for, or a feature of a video player. While the client device 110 does not visually present time-interval sections within the context-aware-video-progress bar 514, in certain implementations, a client device can visually indicate such time-interval sections within (or corresponding to) a context-aware-video-progress bar as part of a graphical user interface.

As depicted in FIG. 5, the context-aware-video-progress bar 514 facilitates more precise and accurate navigate through the frames of the video 506 than a conventional video scrubber. For example, in some embodiments, the client device 110 detects a user selection of a time location 512 within the context-aware-video-progress bar 514 corresponding to a time-interval section sized in proportion to a relative proportion of reference frames (e.g., a normalized congestion score) for a time interval within a video-scene-proportionate timeline. Based on detecting the user selection of the time location 512, the client device 110 presents (or renders) a thumbnail image 508 of a portion (or frame) of the video 506 from a time within the time interval corresponding to the time-interval section of the video-scene-proportionate timeline.

FIG. 5 depicts merely an example of navigation or scrubbing with a context-aware-video-progress bar. In some embodiments, a client device presents an image of a portion of a video from a time corresponding to a time location within a context-aware-video-progress bar—before or after a progress marker indicating a current frame of the video—based on detecting a user interaction with the time location. Additionally, or alternatively, a client device presents a term, phrase, summary, or other description of a scene (or portion) of a video from a time corresponding to a time location within a context-aware-video-progress bar based on detecting a user interaction with the time location. A video file or video packets for a video may include such a term, phrase, summary, or other description of a scene (or portion) of the video annotated for particular frames.

Figure 6:
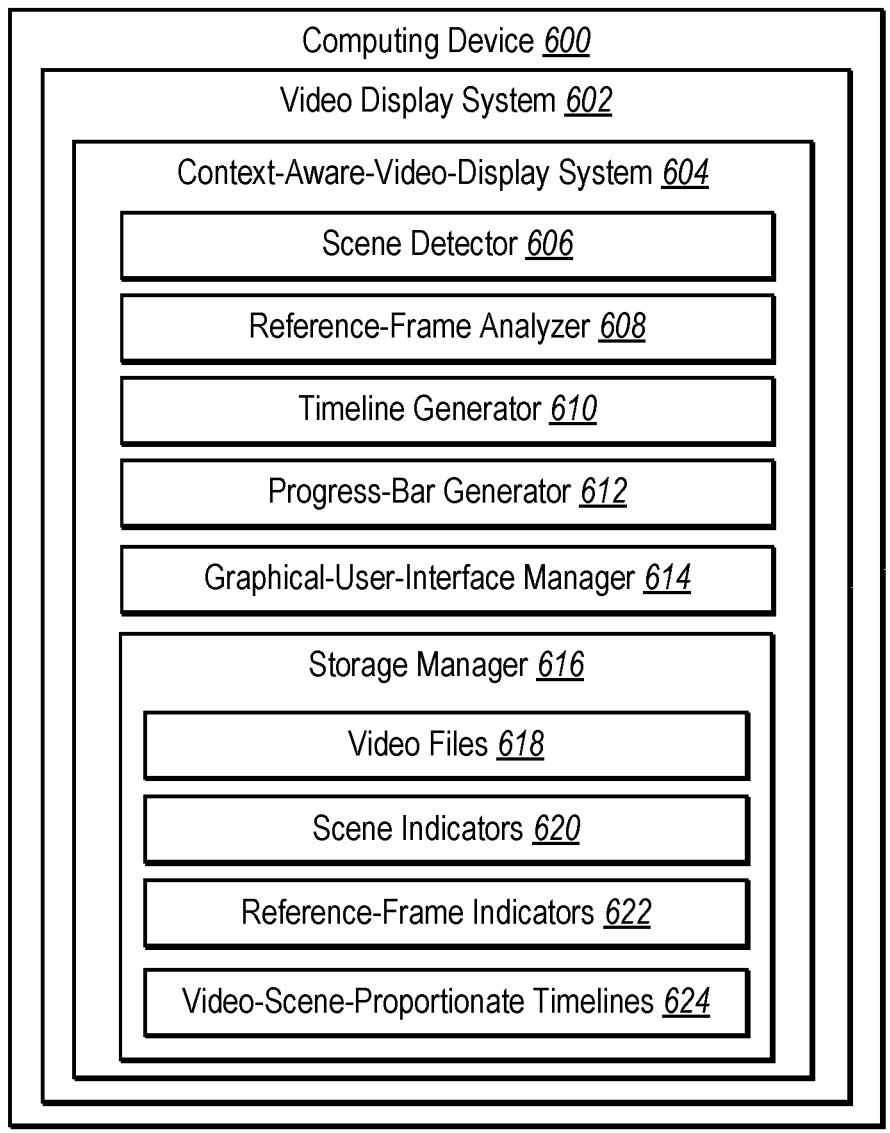
FIG. 6 illustrates a schematic diagram of an example architecture of the video display system and the context-aware-video-display system of FIG. 1 in accordance with one or more embodiments.

Turning now to FIG. 6, this figure provides additional detail regarding components and features of a video display system and a context-aware-video-display system. In particular, FIG. 6 illustrates a computing device 600 implementing a video display system 602 and a context-aware-video-display system 604. The video display system 602 constitutes an embodiment of the video display system 112, and the context-aware-video-display system 604 constitutes an embodiment of the context-aware-video-display system 114. The computing device 600 can include one or more servers (e.g., the server(s) 102) and/or one or more client devices (e.g., the client device 110).

As shown in FIG. 6, the computing device 600 includes the video display system 602. In some embodiments, the video display system 602 uses its components to perform various playback, rendering, searching, modification, and/or other functions with regard to a video or other digital content. Additionally, in some cases, the video display system 602 facilitates annotations, displays, edits, modifications, and renderings of videos or video frames or scenes based on requests from client devices.

As further shown in FIG. 6, the computing device 600 includes the context-aware-video-display system 604. The context-aware-video-display system 604 includes, but is not limited to, a scene detector 606, a reference-frame analyzer 608, a timeline generator 610, a progress-bar generator 612, a graphical-user-interface manager 614, and/or a storage manager 616. The following paragraphs describe each of these components.

As just mentioned, the context-aware-video-display system 604 includes the scene detector 606. The scene detector 606 identifies scenes within videos, such as videos from video files 618. In some embodiments, for instance, the scene detector 606 identifies subsets of frames. In certain cases, the scene detector 606 identifies subsets of frames corresponding to different scenes based on (i) metadata within a video file or within video-data packets or (ii) similarity of image features between (or among) contiguous frames from the video. As indicated above, in some implementations, the scene detector 606 identifies subsets of frames corresponding to different scenes as depicted in FIGS. 2, 3A, and/or 4A and as described above. In some cases, the scene detector 606 stores or identifies the scenes using scene indicators 620.

As further shown in FIG. 6, the context-aware-video-display system 604 includes the reference-frame analyzer 608. The reference-frame analyzer 608 analyzes videos and identifies or detects reference frames corresponding to scenes within the videos. For example, the reference-frame analyzer 608 can identify reference frames based on (i) metadata within a video file or within video-data packets or (ii) feature-matching scores from frames within each subset of frames. Accordingly, in some embodiments, the reference-frame analyzer 608 generates feature-matching scores for subsets of frames corresponding to a scene. Based on the feature-matching scores, the reference-frame analyzer 608 selects one or more reference frames from among a subset of frames corresponding to the scene. As indicated above, the reference-frame analyzer 608 identifies or detects reference frames corresponding to scenes within videos as depicted in FIGS. 2, 3A, and/or 4A and as described above. In some cases, the scene detector 606 stores or identifies the reference frames using reference-frame indicators 622.

As further shown in FIG. 6, the context-aware-video-display system 604 includes the timeline generator 610. The timeline generator 610 generates, adjusts, or integrates video-scene-proportionate timelines, such as video-scene-proportionate timelines 624. Consistent with the disclosure above, the timeline generator 610 can generate, adjust, or integrate a video-scene-proportionate timeline comprising time-interval sections sized proportionate to relative proportions of scenes (or reference frames) across time intervals. Accordingly, the timeline generator 610 can generate video-scene-proportionate timelines as depicted in FIGS. 2, 3B, and/or 4B and as described above.

In addition to the timeline generator 610, the context-aware-video-display system 604 includes the progress-bar generator 612. The progress-bar generator 612 generates, adjusts, or integrates context-aware-video-progress bars. For example, the progress-bar generator 612 can generate a context-aware-video-progress bar including a video-scene-proportionate timeline for display within a graphical user interface. Consistent with the disclosure above, the progress-bar generator 612 can generate, adjust, or integrate context-aware-video-progress bars as depicted in FIGS. 2, 3B, and/or 4B and as described above.

As further shown in FIG. 6, and as its name suggests, the graphical-user-interface manager 614 generates data for graphical user interfaces and/or provides data representing context-aware-video-progress bars. For example, the graphical-user-interface manager 614 provides data representing a video (or video frames), a context-aware-video-progress bar, and an image for a frame corresponding to a time location within the context-aware-video-progress bar—for display within a graphical user interface. In some implementations, the graphical-user-interface manager 614 can generate data for the graphical user interface depicted in FIG. 5.

As suggested above, the storage manager 616 accesses and stores files, indicators, and other data for the context-aware-video-display system 604. For example, the storage manager 616 can communicate with one or more of the scene detector 606, the reference-frame analyzer 608, the timeline generator 610, the progress-bar generator 612, or the graphical-user-interface manager 614, to access and provide data corresponding to the video files 618, the scene indicators 620, the reference-frame indicators 622, or the video-scene-proportionate timelines 624 stored on a storage medium.

Each of the components 606-624 of the context-aware-video-display system 604 can include software, hardware, or both. For example, the components 606-624 can include one or more instructions stored on a computer-readable storage medium and executable by processors of one or more computing devices, such as a client device or server device. When executed by the one or more processors, the computer-executable instructions of the context-aware-video-display system 604 can cause the computing device(s) to perform the methods described herein. Alternatively, the components 606-624 can include hardware, such as a special-purpose processing device to perform a certain function or group of functions. Alternatively, the components 606-624 of the context-aware-video-display system 604 can include a combination of computer-executable instructions and hardware.

Furthermore, the components 606-624 of the context-aware-video-display system 604 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 606-624 may be implemented as a stand-alone application, such as a desktop or mobile application. Furthermore, the components 606-624 may be implemented as one or more web-based applications hosted on a remote server. The components 606-624 may also be implemented in a suite of mobile device applications or "apps." To illustrate, the components 606-624 may be implemented in a software application, including, but not limited to, ADOBE PREMIERE PRO, ADOBE CREATIVE CLOUD, and ADOBE FLASH PLAYER. "ADOBE," "PREMIERE PRO," "CREATIVE CLOUD," "FLASH," and "FLASH PLAYER" are either registered trademarks or trademarks of Adobe Inc. in the United States and/or other countries.

Figure 7:
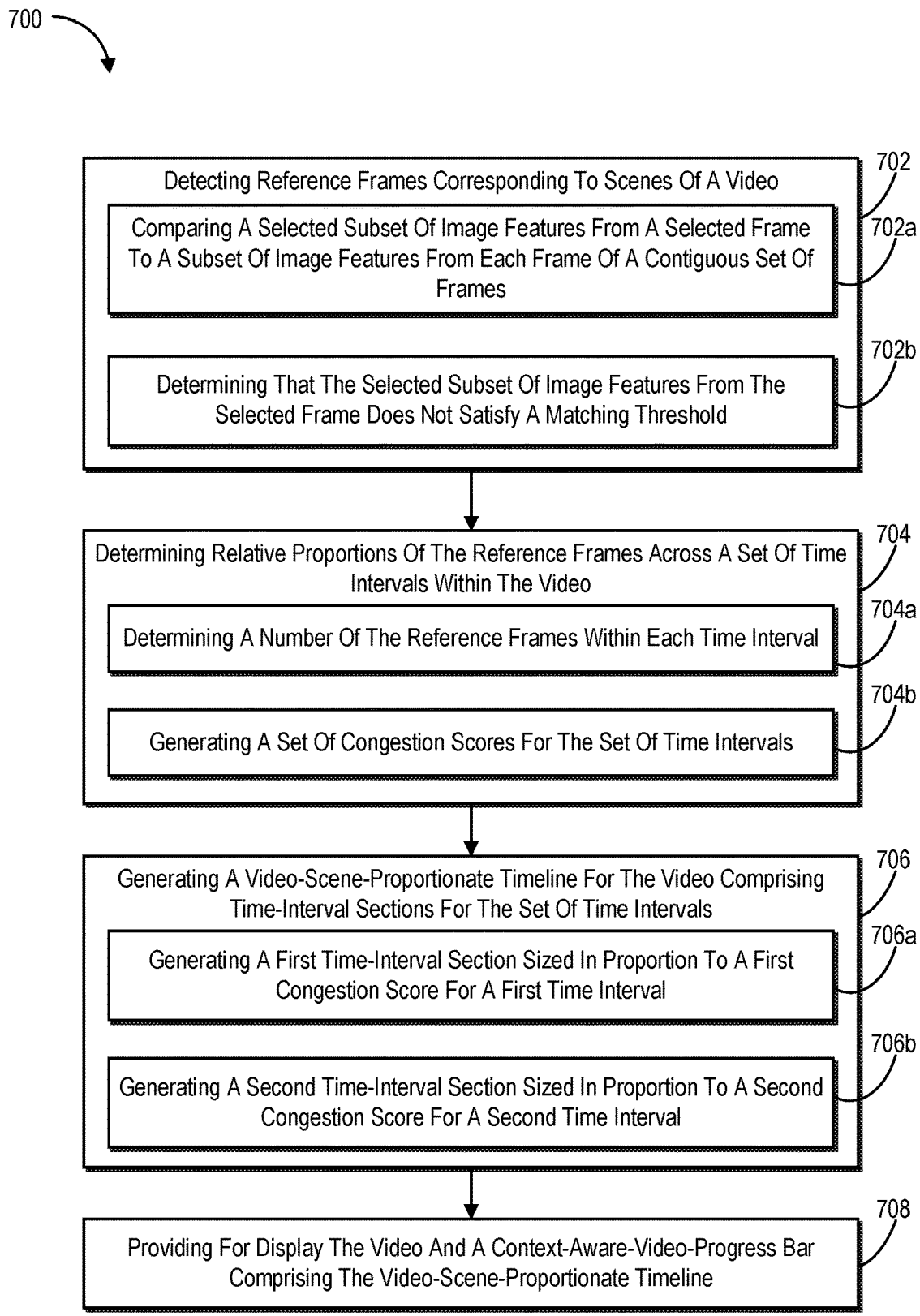
FIG. 7 illustrates a flowchart of a series of acts for generating a context-aware-video-progress bar including a video-scene-proportionate timeline with proportionately sized time-interval sections in accordance with one or more embodiments.

Turning now to FIG. 7, this figure illustrates a flowchart of a series of acts 700 of generating a context-aware-video-progress bar including a video-scene-proportionate timeline with proportionately sized time-interval sections in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system comprising one or more memory devices and one or more server devices can perform the acts of FIG. 7.

As shown in FIG. 7, the acts 700 include an act 702 of detecting reference frames corresponding to scenes of a video. In particular, in some embodiments, the act 700 includes detecting reference frames corresponding to scenes within a video by selecting frames from among multiple frames based on matching image features. As further indicated by FIG. 7, the act 702 may include (i) an act 702a of comparing a selected subset of image features from a selected frame to a subset of image features from each frame of a contiguous set of frames and (ii) an act 702b of determining that the selected subset of image features from the selected frame does not satisfy a matching threshold.

As suggested above, in some implementations, detecting the reference frames corresponding to the scenes of (or within) the video comprises detecting a reference frame of the reference frames in part by: identifying a subset of frames corresponding to a scene within the video; generating a subset of feature-matching scores for the subset of frames corresponding to the scene by determining a degree to which a particular subset of image features within a particular frame matches subsets of image features within other frames from the subset of frames; and selecting the reference frame from among the subset of frames based on the subset of feature-matching scores.

Additionally, or alternatively, in some embodiments, detecting the reference frames corresponding to the scenes of (or within) the video comprises detecting a first reference frame and a second reference frame of the reference frames in part by: identifying a first subset of frames and a second subset of frames corresponding to a scene within the video; generating a first subset of feature-matching scores for the first subset of frames corresponding to the scene by determining a degree to which a particular subset of image features within a particular frame from the first subset of frames matches subsets of image features within other frames from the first subset of frames; generating a second subset of feature-matching scores for the second subset of frames corresponding to the scene by determining a degree to which a particular subset of image features within a particular frame from the second subset of frames matches subsets of image features within other frames from the second subset of frames; and selecting the first reference frame from among the first subset of frames and the second reference frame from among the second subset of frames based on the first subset of feature-matching scores and the second subset of feature-matching scores.

Relatedly, in one or more embodiments, identifying the subset of frames corresponding to the scene within the video comprises: detecting image features within a set of frames corresponding to the video; comparing a selected subset of image features from a selected frame to a subset of image features from each frame of a contiguous set of frames in proximity to the selected frame; determining that the selected subset of image features from the selected frame does not satisfy a matching threshold in comparison to the subset of image features from each frame of the contiguous set of frames; and identifying the selected frame as a frame for the subset of frames corresponding to the scene.

As further indicated above, in some cases, generating a feature-matching score for a frame from the subset of feature-matching scores for the subset of frames comprises determining a mean number of matching image features for the frame in common with each other frame within the subset of frames.

As further shown in FIG. 7, the acts 700 include an act 704 of determining relative proportions of the reference frames across a set of time intervals within the video. As further indicated by FIG. 7, the act 704 may include (i) an act 704a of determining a number of the reference frames within each time interval and (ii) an act 704b of generating a set of congestion scores for the set of time intervals.

As suggested above, in certain implementations, the act 704 includes generating a set of congestion scores for the set of time intervals indicating relative proportions of the reference frames within particular time intervals. Further, in some cases, the act 704 comprises determining a normalized congestion score for a time interval from the set of time intervals by determining a ratio of a number of the reference frames within the time interval to a total number of the reference frames within the video.

As further shown in FIG. 7, the acts 700 include an act 706 of generating a video-scene-proportionate timeline for the video comprising time-interval sections for the set of time intervals. In particular, in certain implementations, the act 706 includes generating a video-scene-proportionate timeline for the video comprising time-interval sections for the set of time intervals sized according to the relative proportions of the reference frames across the set of time intervals. In some cases, the act 706 includes generating a video-scene-proportionate timeline for the video comprising time-interval sections in proportion to the set of congestion scores for the set of time intervals. As further indicated by FIG. 7, the act 706 may include (i) an act 706a of generating a first time-interval section sized in proportion to a first congestion score for a first time interval and (ii) an act 706b of generating a second time-interval section sized in proportion to a second congestion score for a second time interval.

For example, in some cases, the act 706 includes generating a first time-interval section sized in proportion to a first normalized congestion score for a first time interval of the video; and generating a second time-interval section sized in proportion to a second normalized congestion score for a second time interval of the video. Relatedly, in one or more embodiments, the act 706 includes determining the first time interval includes a larger proportion of the reference frames than the second time interval; and generating the first time-interval section larger than the second time-interval section within the video-scene-proportionate timeline.

Similarly, in certain implementations, generating the video-scene-proportionate timeline for the video comprises: generating a larger time-interval section sized in proportion to a first congestion score indicating a relatively larger proportion of the reference frames within a first time interval; and generating a smaller time-interval section sized in proportion to a second congestion score indicating a relatively smaller proportion of the reference frames within a second time interval.

As further shown in FIG. 7, the acts 700 include an act 708 of providing for display the video and a context-aware-video-progress bar comprising the video-scene-proportionate timeline. In particular, in certain implementations, the act 708 includes providing, for display within a graphical user interface, the video and a context-aware-video-progress bar comprising the video-scene-proportionate timeline.

In addition to the acts 702-708, in certain implementations, the acts 700 further include detecting a user selection of a time location within the context-aware-video-progress bar corresponding to a time-interval section sized in proportion to a congestion score for a time interval within the video-scene-proportionate timeline; and based on detecting the user selection of the time location, rendering a thumbnail image of a portion of the video from a time within the time interval corresponding to the time-interval section of the video-scene-proportionate timeline.

Similarly, in one or more implementations, the acts 700 further include providing, for display within the graphical user interface, a first frame of the video corresponding to a first scene; detecting a user selection of a time location within the context-aware-video-progress bar corresponding to a time-interval section sized in proportion to a congestion score for a time interval within the video-scene-proportionate timeline; and based on detecting the user selection of the time location, rendering a thumbnail image of a second frame of the video corresponding to a second scene from a time within the time interval corresponding to the time-interval section of the video-scene-proportionate timeline.

In addition (or in the alternative) to the acts described above, in one or more embodiments, the acts 700 include detecting a set of scenes within a video; determining relative proportions of the set of scenes across a set of time intervals within the video; and generating a video-scene-proportionate timeline for the video comprising time-interval sections for the set of time intervals sized according to the relative proportions of the scenes across the set of time intervals.

In addition to the foregoing, some embodiments involve performing a step for scaling a video-scene-proportionate timeline for the video comprising sections sized to proportionally indicate an amount of scenes within each section. For instance, the algorithms and acts described in relation to FIGS. 4A, 4B, and 4C can comprise the corresponding structure (e.g., acts and/or algorithms) for a step for scaling a video-scene-proportionate timeline for the video comprising sections sized to proportionally indicate an amount of scenes within each section.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 8:
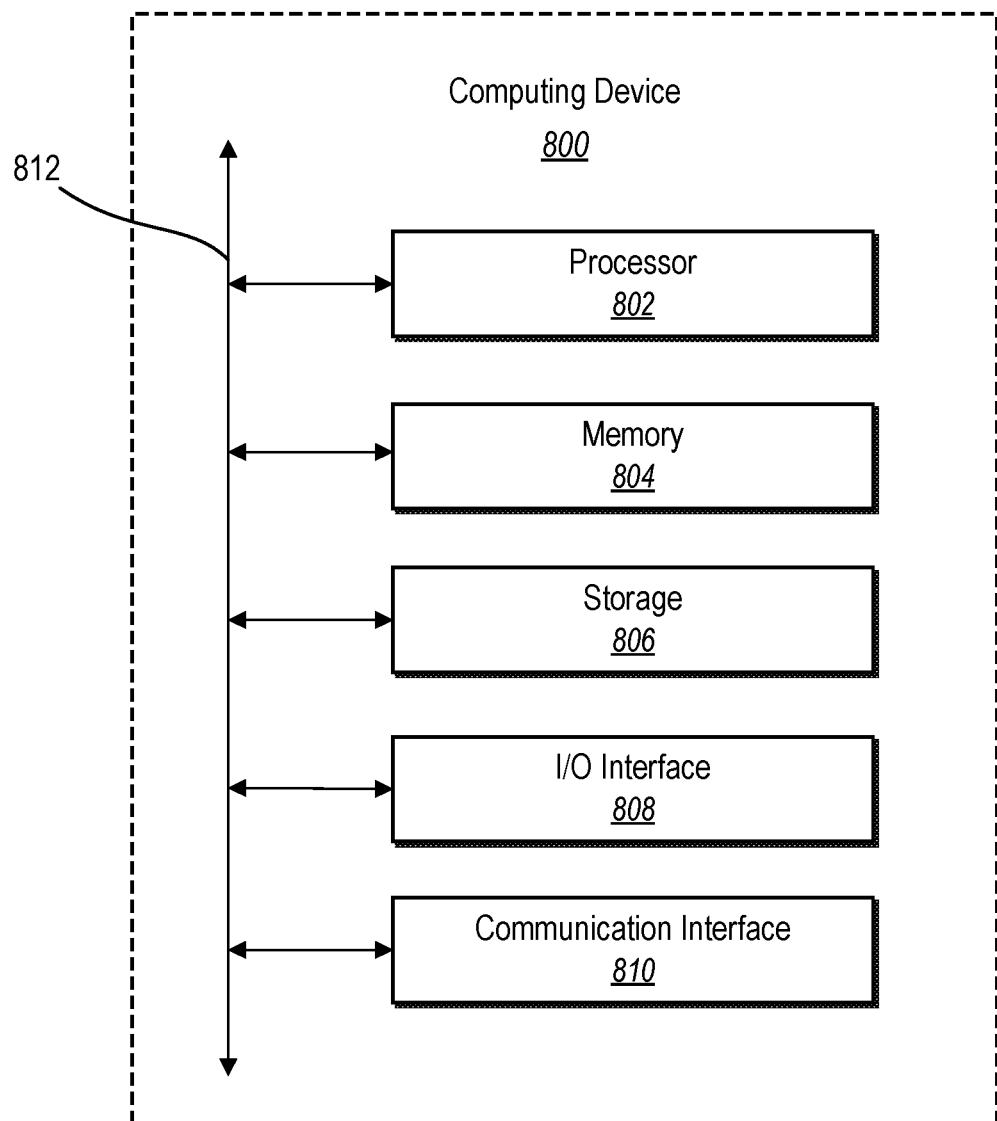
FIG. 8 illustrates a block diagram of an example computing device for implementing one or more embodiments of the present disclosure.

FIG. 8 illustrates a block diagram of example computing device 800 that may be configured to perform one or more of the processes described above. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for digitizing real-world objects, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions related to object digitizing processes (e.g., digital scans, digital models).

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computing device to:
    detect reference frames comprising image features similar to other frames of scenes within a video by:
        determining, utilizing a feature-detection algorithm, a numerical value of image-feature points that are shared in common between particular frames of same scenes and are associated with objects from the particular frames;
        generating feature-matching scores for frames corresponding to the scenes whereby a feature-matching score indicates a degree to which particular image-feature points within a particular frame matches image-feature points within the other frames of a same scene based on the numerical value of image-feature points that are shared in common between the particular frame and the other frames of the same scene; and
        selecting particular reference frames for particular scenes based on a highest feature-matching score from among the feature-matching scores for frames corresponding to a particular scene;
    determine relative proportions of the reference frames across a set of time intervals within the video;
    generate a video-scene-proportionate timeline for the video comprising time-interval sections for the set of time intervals sized according to the relative proportions of the reference frames across the set of time intervals; and
    provide, for display within a graphical user interface, the video and a context-aware-video-progress bar comprising the video-scene-proportionate timeline.

2. The non-transitory computer readable medium of claim 1, further comprising instructions that, when executed by the at least one processor, cause the computing device to detect the reference frames comprising the image features similar to the other frames of the scenes within the video in part by:
    detecting, for a first scene, a first reference frame comprising a subset of image-feature points depicting a first object; and
    detecting, for a second scene, a second reference frame comprising a subset of image-feature points depicting a second object.

3. The non-transitory computer readable medium of claim 1, further comprising instructions that, when executed by the at least one processor, cause the computing device to identify a subset of frames corresponding to a scene within the video in part by:
    detecting a set of image-feature points within a set of frames corresponding to the video;
    comparing a selected subset of image-feature points from a selected frame to a subset of image-feature points from each frame of a contiguous set of frames within a threshold number of frames from the selected frame;
    determining that the selected subset of image-feature points from the selected frame does not satisfy a minimum number or a minimum percentage of matching image-feature points shared in common with the subset of image-feature points from each frame of the contiguous set of frames; and
    identifying the selected frame as a frame for the subset of frames corresponding to the scene.

4. The non-transitory computer readable medium of claim 1, further comprising instructions that, when executed by the at least one processor, cause the computing device to generate a feature-matching score for a frame from a subset of feature-matching scores for a subset of frames by determining a mean number of matching image-feature points for the frame in common with each other frame within the subset of frames.

5. The non-transitory computer readable medium of claim 1, further comprising instructions that, when executed by the at least one processor, cause the computing device to determine a normalized congestion score for a time interval from the set of time intervals by determining a ratio of a number of the reference frames within the time interval to a total number of the reference frames within the video.

6. The non-transitory computer readable medium of claim 5, further comprising instructions that, when executed by the at least one processor, cause the computing device to generate the video-scene-proportionate timeline for the video by:
    generating a first time-interval section sized in proportion to a first normalized congestion score for a first time interval of the video; and
    generating a second time-interval section sized in proportion to a second normalized congestion score for a second time interval of the video.

7. The non-transitory computer readable medium of claim 6, further comprising instructions that, when executed by the at least one processor, cause the computing device to determine the numerical value of image-feature points that are shared in common between the particular frames of the same scenes in part by:
  resizing a subset of frames corresponding to a scene to generate a subset of smaller frames;
  detecting, utilizing the feature-detection algorithm, subsets of image-feature points within particular smaller frames from the subset of smaller frames; and
  determining a particular numerical value of image-feature points shared in common between the particular smaller frames.

8. The non-transitory computer readable medium of claim 1, further comprising instructions that, when executed by the at least one processor, cause the computing device to:
  detect a user selection of a time location within the context-aware-video-progress bar corresponding to a time-interval section sized in proportion to a congestion score for a time interval within the video-scene-proportionate timeline; and
  based on detecting the user selection of the time location:
    select a portion of the video from a time within the time interval corresponding to the time-interval section of the video-scene-proportionate timeline; and
    render a thumbnail image of the portion of the video overlaid on a display of the video.

9. A system comprising:
  one or more memory devices comprising a video having multiple frames; and
  one or more server devices that cause the system to:
    detect reference frames comprising image features similar to other frames of scenes within a video by:
      determining, utilizing a feature-detection algorithm, a numerical value of image-feature points that are shared in common between particular frames of same scenes and are associated with objects from the particular frames;
      generating feature-matching scores for frames corresponding to the scenes whereby a feature-matching score indicates a degree to which particular image-feature points within a particular frame matches image-feature points within the other frames of a same scene based on the numerical value of image-feature points that are shared in common between the particular frame and the other frames of the same scene; and
      selecting particular reference frames for particular scenes from among the frames based on a highest feature-matching score from among the feature-matching scores for frames corresponding to a particular scene;
    determine relative proportions of the reference frames across a set of time intervals within the video by:
      determining a number of the reference frames within each time interval from the set of time intervals;
      generating a set of congestion scores for the set of time intervals indicating relative proportions of the reference frames within particular time intervals;
    generate a video-scene-proportionate timeline for the video comprising time-interval sections in proportion to the set of congestion scores for the set of time intervals; and
    provide, for display within a graphical user interface, the video and a context-aware-video-progress bar comprising the video-scene-proportionate timeline.

10. The system of claim 9, wherein the one or more server devices further cause the system to detect the reference frames comprising the image features similar to the other frames of the scenes within the video in part by:
  detecting, for a first scene, a first reference frame comprising a subset of image-feature points depicting a first object; and
  detecting, for a second scene, a second reference frame comprising a subset of image-feature points depicting a second object.

11. The system of claim 9, wherein the one or more server devices further cause the system to identify a subset of frames corresponding to a scene within the video in part by:
  detecting a set of image-feature points within a set of frames corresponding to the video;
  comparing a selected subset of image-feature points from a selected frame to a subset of image-feature points from each frame of a contiguous set of frames within a threshold number of frames from the selected frame;
  determining that the selected subset of image-feature points from the selected frame does not satisfy a minimum number or a minimum percentage of matching image-feature points shared in common with the subset of image-feature points from each frame of the contiguous set of frames; and
  identifying the selected frame as a frame for the first subset of frames corresponding to the scene.

12. The system of claim 9, wherein the one or more server devices further cause the system to generate a feature-matching score for a frame from a subset of feature-matching scores for a subset of frames by determining a mean number of matching image-feature points for the frame in common with each other frame within the subset of frames.

13. The system of claim 9, wherein the one or more server devices further cause the system to determine a congestion score for a time interval from the set of time intervals by determining, as a normalized congestion score for the time interval, a ratio of a number of the reference frames within the time interval to a total number of the reference frames within the video.

14. The system of claim 9, wherein the one or more server devices further cause the system to generate the video-scene-proportionate timeline for the video by:
  generating a larger time-interval section sized in proportion to a first congestion score indicating a relatively larger proportion of the reference frames within a first time interval; and
  generating a smaller time-interval section sized in proportion to a second congestion score indicating a relatively smaller proportion of the reference frames within a second time interval.

15. The system of claim 9, wherein the one or more server devices further cause the system to determine the numerical value of image-feature points that are shared in common between the particular frames of the same scenes in part by:
  resizing a subset of frames corresponding to a scene to generate a subset of smaller frames;
  detecting, utilizing the feature-detection algorithm, subsets of image-feature points within particular smaller frames from the subset of smaller frames; and
  determining a particular numerical value of image-feature points shared in common between the particular smaller frames.

16. A computer-implemented method comprising:
  detecting reference frames comprising image features similar to other frames of scenes within a video by:
    determining, utilizing a feature-detection algorithm, a numerical value of image-feature points that are shared in common between particular frames of same scenes and are associated with objects from the particular frames;

generating feature-matching scores for frames corresponding to the scenes whereby a feature-matching score indicates a degree to which particular image-feature points within a particular frame matches image-feature points within the other frames of a same scene based on the numerical value of image-feature points that are shared in common between the particular frame and the other frames of the same scene; and selecting particular reference frames for particular scenes based on a highest feature-matching score from among the feature-matching scores for frames corresponding to a particular scene;

determining relative proportions of the reference frames across a set of time intervals within the video;

generating a video-scene-proportionate timeline for the video comprising time-interval sections for the set of time intervals sized according to the relative proportions of the reference frames across the set of time intervals; and providing, for display within a graphical user interface, the video and a context-aware-video-progress bar comprising the video-scene-proportionate timeline.

17. The computer-implemented method of claim 16, wherein generating a feature-matching score for a frame from a subset of feature-matching scores for a subset of frames comprises determining a mean number of matching image-feature points for the frame in common with each other frame within the subset of frames.

18. The computer-implemented method of claim 16, wherein detecting the reference frames comprising image features similar to the other frames of the scenes within the video comprises:

detecting, for a first scene, a first reference frame comprising a subset of image-feature points depicting a first object; and detecting, for a second scene, a second reference frame comprising a subset of image-feature points depicting a second object.

19. The computer-implemented method of claim 16, further comprising identifying a subset of frames corresponding to a scene within the video in part by:

detecting a set of image-feature points within a set of frames corresponding to the video;

comparing a selected subset of image-feature points from a selected frame to a subset of image-feature points from each frame of a contiguous set of frames within a threshold number of frames from the selected frame;

determining that the selected subset of image-feature points from the selected frame does not satisfy a minimum number or a minimum percentage of matching image-feature points shared in common with the subset of image-feature points from each frame of the contiguous set of frames; and identifying the selected frame as a frame for the subset of frames corresponding to the scene.

20. The computer-implemented method of claim 16, further comprising:

detecting a user selection of a time location within the context-aware-video-progress bar corresponding to a time-interval section sized in proportion to a congestion score for a time interval within the video-scene-proportionate timeline; and based on detecting the user selection of the time location:
selecting a portion of the video from a time within the time interval corresponding to the time-interval section of the video-scene-proportionate timeline; and
rendering a thumbnail image of the portion of the video overlaid on a display of the video.

* * * * *